(12) United States Patent
Qin et al.

(10) Patent No.: US 12,360,497 B2
(45) Date of Patent: Jul. 15, 2025

(54) CONTROL METHOD AND APPARATUS

(71) Applicant: SHENZHEN YINWANG INTELLIGENT TECHNOLOGIES CO., LTD., Shenzhen (CN)

(72) Inventors: Tao Qin, Shenzhen (CN); Fengyu Liu, Shanghai (CN); Jie Li, Shenzhen (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 220 days.

(21) Appl. No.: 17/990,290

(22) Filed: Nov. 18, 2022

(65) Prior Publication Data

US 2023/0083334 A1 Mar. 16, 2023

Related U.S. Application Data

(63) Continuation of application No. PCT/CN2020/091045, filed on May 19, 2020.

(51) Int. Cl.
*G05B 9/03* (2006.01)
*B60R 16/023* (2006.01)
(Continued)

(52) U.S. Cl.
CPC ............ *G05B 9/03* (2013.01); *B60R 16/0232* (2013.01); *G05B 23/0259* (2013.01); *G06F 11/2028* (2013.01); *G05B 2219/14014* (2013.01)

(58) Field of Classification Search
CPC ........... G05B 9/03; G06F 11/202–2053; B60R 16/0232
See application file for complete search history.

(56) References Cited

U.S. PATENT DOCUMENTS 7,587,465 B1 * 9/2009 Muchow ............. G06F 11/2023
714/4.12
2013/0274900 A1 10/2013 Uhde et al.
(Continued)

FOREIGN PATENT DOCUMENTS

CN 1275000 A 11/2000
CN 1527169 A 9/2004
CN 109733461 A 5/2019

OTHER PUBLICATIONS

Extended European Search Report in European Appln No. 20936874. 5, dated May 22, 2023, 8 pages.
(Continued)

*Primary Examiner* — Michael Maskulinski
(74) *Attorney, Agent, or Firm* — Fish & Richardson P.C.

(57) ABSTRACT

Example control methods and apparatus are described. One example control method includes obtaining, by a first controller, a first operating status of the first controller before a control function of the first controller and/or a control function of a second controller are/is activated. The first controller receives first indication information sent by the second controller, where the first indication information indicates a controller status of the second controller. The first controller sets a first controller mode of the first controller based on the first operating status and the first indication information. Second indication information is sent by the first controller to the second controller, so that a first controller mode of the second controller that is set by the second controller does not conflict with the first controller mode of the first controller.

20 Claims, 9 Drawing Sheets

(51) Int. Cl.
*G05B 23/02* (2006.01)
*G06F 11/20* (2006.01)

(56) References Cited

U.S. PATENT DOCUMENTS

| | | |
|---|---|---|
| 2017/0277607 A1 | 9/2017 | Samii et al. |
| 2019/0241207 A1 | 8/2019 | Jeong et al. |
| 2020/0076343 A1* | 3/2020 | Zhang .................... H02P 23/12 |

OTHER PUBLICATIONS

Office Action in Indian Appln. No. 2022-17069496, mailed on May 19, 2025, 6 pages.

* cited by examiner

CONTROL METHOD AND APPARATUS

CROSS-REFERENCE TO RELATED APPLICATIONS

This application is a continuation of International Application No. PCT/CN2020/091045, filed on May 19, 2020, the disclosure of which is hereby incorporated by reference in its entirety.

TECHNICAL FIELD

This application relates to the field of automobile technologies, and more specifically, to a control method and apparatus.

BACKGROUND

With the rapid development of intelligent driving, requirements for an automobile control system become higher. For example, a control system is usually required to have a redundancy capability. In other words, the control system should include two control branches. When one control branch fails, the other control branch can still provide a control function.

A control system in the conventional technology uses two controllers to implement redundant control. By default, a first controller is a primary controller, and a second controller is a secondary controller. After the two controllers are woken up and perform handshake, a primary-controller/secondary-controller mode of each of the controllers is determined, and then the control system is activated. After the control system starts working, if the primary controller is in an abnormal state, the secondary controller performs control. In this way, the control system has a redundancy capability. However, according to this control method, if the two controllers are not woken up synchronously or an initial state of one controller is faulty, the two controllers cannot perform handshake. As a result, the entire control system cannot be activated, and reliability of the control system is reduced.

SUMMARY

This application provides a control method and apparatus, to improve reliability of a control system.

According to a first aspect, a control method is provided. A first controller obtains a first operating status of the first controller before a control function of the first controller and/or a control function of a second controller are/is activated, where the first operating status includes a faulty state or a non-faulty state; the first controller receives first indication information sent by the second controller, where the first indication information indicates that a status of the second controller is a primary-controller state, a secondary-controller state, or a primary-controller/secondary-controller pending state; the first controller sets a first primary-controller/secondary-controller mode of the first controller based on the first operating status and the first indication information, where the first primary-controller/secondary-controller mode of the first controller includes a mode in which the first controller is a primary controller or a mode in which the first controller is a secondary controller; and the first controller sends second indication information to the second controller, where the second indication information indicates the first primary-controller/secondary-controller mode of the first controller, so that a first primary-controller/secondary-controller mode of the second controller that is set by the second controller does not conflict with the first primary-controller/secondary-controller mode of the first controller; and the first primary-controller/secondary-controller mode of the second controller includes a mode in which the second controller is the primary controller or a mode in which the second controller is the secondary controller.

It should be understood that the first controller and the second controller are controllers in a control system. The description "before the control function of the first controller and/or the control function of the second controller are/is activated" may be understood as "before the first controller, or second controller, or both in the control system perform the controls functions", or may be understood as "before the control system is activated (before entering a working state).

It should be understood that no conflict between the first primary-controller/secondary-controller mode of the second controller that is set by the second controller and the first primary-controller/secondary-controller mode of the first controller means that when the first primary-controller/secondary-controller mode of the first controller is the primary-controller mode, the first primary-controller/secondary-controller mode of the second controller is the secondary-controller mode; or when the first primary-controller/secondary-controller mode of the first controller is the secondary-controller mode, the first primary-controller/secondary-controller mode of the second controller is the primary-controller mode.

In this embodiment of this application, before the control function of the first controller and/or the control function of the second controller are/is activated, the first controller can obtain an operating status of the first controller, receive the first indication information sent by the second controller, and then set the first primary-controller/secondary-controller mode of the first controller based on the operating status of the first controller and the first indication information. The first controller can further send the first primary-controller/secondary-controller mode of the first controller to the second controller, so that the second controller can set the first primary-controller/secondary-controller mode of the second controller based on the first primary-controller/secondary-controller mode of the first controller. In this way, in the control system, the first controller and the second controller can determine the primary-controller/secondary-controller modes through negotiation. This improves flexibility of determining the primary-controller/secondary-controller mode. In addition, according to the solution in this embodiment of this application, synchronous wakeup of the two controllers is not needed to determine the primary-controller/secondary-controller mode. This effectively avoids a failure of activating the entire control system caused by failure of handshake by two controllers when the two controllers are not synchronously woken up, and further improves reliability of the control system.

It should be understood that, in actual implementation, two cases may occur when an operating status of the second controller is the faulty state. One is that although the second controller is faulty, indication information may be sent based on the operating status of the second controller to indicate that the second controller is the secondary controller. In another case, the indication information cannot be sent, and therefore the first controller cannot receive the indication information.

In a possible implementation, the method further includes: When the first controller does not receive the first indication information or the received first indication information is invalid, the first controller sets a second primary-controller/secondary-controller mode of the first controller based on the first operating status, where when the first operating status is the faulty state, the second primary-controller/secondary-controller mode of the first controller is the mode in which the first controller is the secondary controller, or when the first operating status is the non-faulty state, the second primary-controller/secondary-controller mode of the first controller is the mode in which the first controller is the primary controller; and the first controller sends third indication information to the second controller, where the third indication information indicates the second primary-controller/secondary-controller mode of the first controller, so that a second primary-controller/secondary-controller mode of the second controller that is set by the second controller does not conflict with the second primary-controller/secondary-controller mode of the first controller; and the second primary-controller/secondary-controller mode of the second controller includes the mode in which the second controller is the primary controller or the mode in which the second controller is the secondary controller.

In this embodiment of this application, if the first controller does not receive the first indication information, or the received first indication information is invalid, the first controller can still set the second primary-controller/secondary-controller mode of the first controller based on the operating status of the first controller. Then the second controller may also set the second primary-controller/secondary-controller mode of the second controller based on the second primary-controller/secondary-controller mode of the first controller, so that the primary-controller/secondary-controller modes of the two controllers do not conflict. The problem in the conventional technology that the entire control system cannot be activated because two controllers cannot perform handshake when an initial state of either of the two controllers is a faulty state, or the controllers are not woken up synchronously can be avoided. This improves reliability of a control system.

In a possible implementation, if the first operating status is the faulty state, that the first controller sets a first primary-controller/secondary-controller mode of the first controller based on the first operating status and the first indication information includes: The first controller sets the first primary-controller/secondary-controller mode of the first controller to the mode in which the first controller is the secondary controller based on the first operating status and the first indication information.

In other words, if the first operating status is the faulty state, the first controller is set as the secondary controller; and correspondingly, if the first operating status is the non-faulty state, the first primary-controller/secondary-controller mode of the first controller is set based on the received first instruction information of the second controller.

In a possible implementation, when the first indication information indicates that the status of the second controller is the primary-controller state, that the first controller sets a first primary-controller/secondary-controller mode of the first controller based on the first operating status and the first indication information includes: The first controller sets the first primary-controller/secondary-controller mode of the first controller to the mode in which the first controller is the secondary controller based on the first operating status and the first indication information.

In this embodiment of this application, when the first indication information indicates that the status of the second controller is the primary-controller state, the first controller may set the first primary-controller/secondary-controller mode of the first controller to the secondary-controller mode. In this case, the first controller can ignore the operating status of the first controller, so that efficiency of determining the primary-controller/secondary-controller mode can be improved.

In a possible implementation, when the first indication information indicates that the status of the second controller is the secondary-controller state or the primary-controller/secondary-controller pending state, and the first operating status is the non-faulty state, that the first controller sets a first primary-controller/secondary-controller mode of the first controller based on the first operating status and the first indication information includes: The first controller sets the first primary-controller/secondary-controller mode of the first controller to the mode in which the first controller is the primary controller based on the first operating status and the first indication information.

It should be understood that, when the second controller is faulty, the status of the second controller is the secondary-controller state; or when the primary-controller/secondary-controller mode of the second controller is not determined after initialization of the second controller, the status of the second controller is the primary-controller/secondary-controller pending state. When the foregoing two situations occur, and if the first controller is not faulty, the first controller sets the primary-controller/secondary-controller mode of the first controller to the primary-controller mode.

In a possible implementation, when the first controller is the primary controller, the method further includes: The first controller obtains a second operating status of the first controller, where the second operating status includes a faulty state or a non-faulty state; the first controller receives fourth indication information sent by the second controller, where the fourth indication information indicates that the status of the second controller is one of the primary-controller state, the secondary-controller state, or the primary-controller/secondary-controller pending state; the first controller sets a third primary-controller/secondary-controller mode of the first controller based on the second operating status and the fourth indication information, where the third primary-controller/secondary-controller mode of the first controller includes the mode in which the first controller is the primary controller or the mode in which the first controller is the secondary controller; and the first controller sends fifth indication information to the second controller, where the fifth indication information indicates the third primary-controller/secondary-controller mode of the first controller, so that a third primary-controller/secondary-controller mode of the second controller that is set by the second controller does not conflict with the third primary-controller/secondary-controller mode of the first controller; and the third primary-controller/secondary-controller mode of the second controller includes the mode in which the second controller is the primary controller or the mode in which the second controller is the secondary controller.

In this embodiment of this application, the first controller may be determined as the primary controller based on a case in which the status of the second controller is the primary-controller/secondary-controller pending state, the first indication information is not received, the first indication information is invalid, or the like. In this case, the second controller may not determine the primary-controller/secondary-controller mode of the second controller, or the second controller has determined the primary-controller/secondary-controller mode of the second controller as the primary-controller mode, but the first controller determines the first controller as the primary controller because the indication information is invalid. Therefore, to improve reliability of determining the primary-controller/secondary-controller mode, the primary-controller/secondary-controller mode of the first controller may be determined again based on the second operating status of the first controller and a case in which the second controller sends the fourth indication information.

In a possible implementation, the method further includes: When the first controller does not receive the fourth indication information or the received fourth indication information is invalid, the first controller sets a fourth primary-controller/secondary-controller mode of the first controller based on the second operating status, where when the second operating status is the faulty state, the fourth primary-controller/secondary-controller mode of the first controller is the mode in which the first controller is the secondary controller, or when the second operating status is the non-faulty state, the fourth primary-controller/secondary-controller mode of the first controller is the mode in which the first controller is the primary controller; and the first controller sends sixth indication information to the second controller, where the sixth indication information indicates the fourth primary-controller/secondary-controller mode of the first controller, so that a fourth primary-controller/secondary-controller mode of the second controller that is set by the second controller does not conflict with the fourth primary-controller/secondary-controller mode of the first controller; and the fourth primary-controller/secondary-controller mode of the second controller includes the mode in which the second controller is the primary controller or the mode in which the second controller is the secondary controller.

In a possible implementation, if the second operating status is the faulty state, that the first controller sets a third primary-controller/secondary-controller mode of the first controller based on the second operating status and the fourth indication information includes: The first controller sets the third primary-controller/secondary-controller mode of the first controller to the mode in which the first controller is the secondary controller based on the second operating status and the fourth indication information.

In a possible implementation, when a priority of setting the first controller as the primary controller is lower than a priority of setting the second controller as the primary controller, and the fourth indication information indicates that the status of the second controller is the primary-controller state, that the first controller sets a third primary-controller/secondary-controller mode of the first controller based on the second operating status and the fourth indication information includes: The first controller sets the third primary-controller/secondary-controller mode of the first controller to the mode in which the first controller is the secondary controller based on the second operating status and the fourth indication information.

In a possible implementation, when a priority of setting the first controller as the primary controller is higher than a priority of setting the second controller as the primary controller, and the fourth indication information indicates that the status of the second controller is the primary-controller state, that the first controller sets a third primary-controller/secondary-controller mode of the first controller based on the second operating status and the fourth indication information includes: The first controller sets the third primary-controller/secondary-controller mode of the first controller to the mode in which the first controller is the primary controller based on the second operating status and the fourth indication information.

The primary-controller/secondary-controller mode of the first controller cannot be determined during determining the primary-controller/secondary-controller mode for the second time because after the first controller sets the primary-controller/secondary-controller mode to the primary-controller mode during determining the primary-controller/secondary-controller mode for the first time, the fourth indication information is received during determining the primary-controller/secondary-controller mode for the second time and indicates that the status of the second controller is the primary-controller state. In this embodiment of this application, to avoid the problem, a controller priority is introduced for determining the primary-controller/secondary-controller mode. The primary-controller/secondary-controller mode of the first controller is determined based on a priority. This improves efficiency of determining the primary-controller/secondary-controller mode.

In a possible implementation, when the fourth indication information indicates that the status of the second controller is the secondary-controller state or the primary-controller/secondary-controller pending state, that the first controller sets a third primary-controller/secondary-controller mode of the first controller based on the second operating status and the fourth indication information includes: The first controller sets the third primary-controller/secondary-controller mode of the first controller to the mode in which the first controller is the primary controller based on the second operating status and the fourth indication information.

It should be understood that, if situations such as the fourth indication information indicates that the status of the second controller is the primary-controller/secondary-controller pending state, the fourth indication information is invalid, or the first controller does not receive the fourth indication information still occurs during determining for the second time, the primary-controller/secondary-controller mode of the first controller may be set to the primary-controller mode based on a fact that the operating status of the first controller is the non-faulty state, to reduce determining time.

In a possible implementation, the first controller and the second controller are controllers in a steering system.

It should be understood that the solution in this embodiment of this application may be applied to a control system such as a steering control system, an anti-skid control system, or a brake control system.

In a possible implementation, if the first controller is the primary controller, the method further includes: The first controller activates a steering function if an operating parameter that is of a steering mechanism in the steering system and that is obtained by the first controller meets a steering function activation condition.

In a possible implementation, if the first controller is the secondary controller, and the operating status of the first controller is the non-faulty state, the method further includes: The first controller controls the first controller to be in an on-call state if an operating parameter that is of a steering mechanism in the steering system and that is obtained by the first controller meets a steering function activation condition.

In a possible implementation, at least one of the first indication information, the second indication information, the third indication information, the fourth indication information, the fifth indication information, and the sixth indication information may include signals of consecutive frames.

In this embodiment of this application, the indication information used for communication between the first controller and the second controller may be signals of a plurality of consecutive frames, so that reliability of the information and accuracy of determining the primary-controller/secondary-controller mode can be improved.

In a possible implementation, if the first controller is the primary controller, the method further includes: The first controller calculates a first total control requirement of the control system; the first controller divides the first total control requirement into a first control requirement allocated to the first controller and a second control requirement allocated to the second controller; and the first controller decides to execute the first control requirement.

In a possible implementation, if the first controller is the secondary controller, the method further includes: The first controller receives a third control requirement allocated by the second controller to the first controller; and the first controller decides to execute the third control requirement.

In this embodiment of this application, the total control requirement of the first controller is allocated to the first controller and the second controller according to a specific proportion, and the first controller receives the third control requirement allocated by the second controller to the first controller. In actual implementation, the first controller performs decision-making and executes some requirements based on allocation of a primary controller. According to this requirement allocation manner, a requirement for performance of an execution mechanism corresponding to the first controller in a control system can be reduced, and therefore vehicle costs are reduced.

It should be understood that the primary-controller/secondary-controller modes of the first controller and the second controller may be determined by using a method of presetting primary-controller/secondary-controller modes in the conventional technology. For example, by default, the first controller is the primary controller, and the second controller is a secondary controller. Alternatively, the primary-controller/secondary-controller modes may be determined through negotiation between the two controllers as described in this embodiment of this application. This is not limited in this application.

According to a second aspect, a control method is provided. The method includes: Before a control function of a first controller and/or a control function of a second controller are/is activated, the second controller sends first indication information to the first controller, where the first indication information indicates that a status of the second controller is one of a primary-controller state, a secondary-controller state, or a primary-controller/secondary-controller pending state; the second controller receives second indication information sent by the first controller, where the second indication information indicates a first primary-controller/secondary-controller mode of the first controller; and the second controller sets a first primary-controller/secondary-controller mode of the second controller based on the second indication information, so that the first primary-controller/secondary-controller mode of the second controller does not conflict with the first primary-controller/secondary-controller mode of the first controller, where the first primary-controller/secondary-controller mode of the second controller includes a mode in which the second controller is a primary controller or a mode in which the second controller is a secondary controller.

In a possible implementation, the method further includes: When the second controller does not send the first indication information to the first controller or the sent first indication information is invalid, the second controller receives third indication information sent by the first controller, where the third indication information indicates a second primary-controller/secondary-controller mode of the first controller; and the second controller sets a second primary-controller/secondary-controller mode of the second controller based on the third indication information, so that the second primary-controller/secondary-controller mode of the second controller does not conflict with the second primary-controller/secondary-controller mode of the first controller, where the second primary-controller/secondary-controller mode of the second controller includes the mode in which the second controller is the primary controller or the mode in which the second controller is the secondary controller.

In a possible implementation, when the first controller is the primary controller, the method further includes: The second controller sends fourth indication information to the first controller, where the fourth indication information indicates that the status of the second controller is one of the primary-controller state, the secondary-controller state, or the primary-controller/secondary-controller pending state; the second controller receives fifth indication information sent by the first controller, where the fifth indication information indicates a third primary-controller/secondary-controller mode of the first controller; the second controller sets a third primary-controller/secondary-controller mode of the second controller based on the fifth indication information, so that the third primary-controller/secondary-controller mode of the second controller does not conflict with the third primary-controller/secondary-controller mode of the first controller; and the third primary-controller/secondary-controller mode of the second controller includes the mode in which the second controller is the primary controller or the mode in which the second controller is the secondary controller.

In a possible implementation, the method further includes: When the second controller does not send the fourth indication information to the first controller or the sent fourth indication information is invalid, the second controller receives sixth indication information sent by the first controller, where the sixth indication information indicates a fourth primary-controller/secondary-controller mode of the first controller; and the second controller sets a fourth primary-controller/secondary-controller mode of the second controller based on the sixth indication information, so that the fourth primary-controller/secondary-controller mode of the second controller does not conflict with the fourth primary-controller/secondary-controller mode of the first controller, where the fourth primary-controller/secondary-controller mode of the second controller includes the mode in which the second controller is the primary controller or the mode in which the second controller is the secondary controller.

In a possible implementation, the first controller and the second controller are controllers in a steering system.

In a possible implementation, at least one of the first indication information, the second indication information, the third indication information, the fourth indication information, the fifth indication information, and the sixth indication information may include signals of consecutive frames.

In a possible implementation, if the first controller is the secondary controller, the method further includes: The second controller sends a third control requirement of the first controller to the first controller.

According to a third aspect, a method for requirement allocation and decision-making is provided. The method includes: A first controller calculates a first total control requirement of a control system; the first controller divides the first total control requirement into a first control requirement allocated to the first controller and a second control requirement allocated to a second controller; the first controller receives a third control requirement allocated by the second controller to the first controller; and the first controller decides to execute the first control requirement or the third control requirement based on a primary-controller/secondary-controller mode of the first controller.

In a possible implementation, if the first controller is a primary controller, the first controller decides to execute the first control requirement.

In a possible implementation, if the first controller is a secondary controller, the first controller decides to execute the third control requirement.

It should be understood that the primary-controller/secondary-controller mode of the first controller may be determined by using a method of presetting a primary-controller/secondary-controller mode in the conventional technology. For example, by default, the first controller is the primary controller, and the second controller is the secondary controller. Alternatively, the primary-controller/secondary-controller mode may be determined by using the method according to the first aspect.

In this embodiment of this application, the total control requirement of the first controller is allocated to the first controller and the second controller according to a specific proportion, and the first controller receives the third control requirement allocated by the second controller to the first controller. In actual implementation, the first controller performs decision-making and executes some requirements based on the primary-controller/secondary-controller mode of the first controller. According to this requirement allocation manner, a requirement for performance of an execution mechanism corresponding to the first controller in a control system can be reduced, and therefore vehicle costs are reduced.

According to a fourth aspect, a method for requirement allocation and decision-making is provided. The method includes: A second controller receives a second control requirement allocated by a first controller to the second controller; and the second controller sends, to the first controller, a third control requirement allocated by the second controller to the first controller.

In a possible implementation, the second controller calculates a second total control requirement of a control system, the second controller divides the second total control requirement into a third control requirement allocated to the first controller and a fourth control requirement allocated to the second controller. The second controller receives a second control requirement allocated by the first controller to the second controller. The second controller decides to execute the second control requirement or the fourth control requirement based on a primary-controller/secondary-controller mode of the second controller.

In a possible implementation, if the second controller is a primary controller, the second controller decides to execute the fourth control requirement.

In a possible implementation, if the second controller is a secondary controller, the second controller decides to execute the second control requirement.

According to a fifth aspect, a control system is provided. The control system includes a first controller and a second controller. Before a control function of the first controller and/or a control function of the second controller are/is activated, the first controller is configured to perform the method in the first aspect, and the second controller is configured to perform the method in the second aspect; and/or the first controller is configured to perform the method in the third aspect, and the second controller is configured to perform the method in the fourth aspect.

In embodiments of this application, when the first controller performs the method in the third aspect, and the second controller performs the method in the fourth aspect, the first controller allocates the total control requirement of the first controller to the first controller and the second controller according to a specific proportion, and the second controller also allocates the total control requirement of the second controller to the first controller and the second controller according to a specific proportion. In actual implementation, decision-making and execution are performed based on allocation by a primary controller. Compared with the conventional allocation method (the first controller and the second controller separately allocate respective total control requirements obtained through calculation to the first controller and the second controller according to a specific proportion, and perform execution), in the method provided in this application, system requirement synchronous output is achieved, and smoothness of a redundant control system is improved. In addition, in the conventional technology, only a primary controller controls a corresponding execution mechanism to implement total requirement output. However, according to the method of implementing joint control by the two controllers, a requirement for performance of an execution mechanism in a control system is low, and resource utilization can be improved. Therefore, vehicle costs are reduced.

According to a sixth aspect, a first controller is provided. The first controller includes modules configured to perform the method according to any one of the first aspect or the possible implementations of the first aspect; and/or the first controller includes modules configured to perform the method according to any one of the third aspect or the possible implementations of the third aspect.

According to a seventh aspect, a second controller is provided. The second controller includes modules configured to perform the method according to any one of the second aspect or the possible implementations of the second aspect; and/or the second controller includes modules configured to perform the method according to any one of the fourth aspect or the possible implementations of the fourth aspect.

According to an eighth aspect, a controller is provided. The controller includes an input/output interface, a processor, and a memory. The processor is configured to control the input/output interface to receive and send a signal or information. The memory is configured to store a computer program. The processor is configured to invoke the computer program from the memory and run the computer program, so that the controller performs the method according to any of the foregoing aspects.

According to a ninth aspect, a control system is provided, including the first controller according to the sixth aspect and/or the second controller according to the seventh aspect.

According to a tenth aspect, a computer program product is provided. The computer program product includes computer program code, and when the computer program code is run on a computer, the computer is enabled to perform the method according to any of the foregoing aspects.

According to an eleventh aspect, a computer-readable medium is provided. The computer-readable medium stores program code. When the computer program code is run on a computer, the computer is enabled to perform the method according to any of the foregoing aspects.

According to a twelfth aspect, a chip system is provided. The chip system includes a processor, configured to support a first controller and/or a second controller to implement the functions described in the foregoing aspects, such as generating, receiving, sending, or processing data and/or information in the foregoing method.

In a possible design, the chip system further includes a memory. The memory is configured to store necessary program instructions and data of the first controller and/or the second controller. The chip system may include a chip, or may include a chip and another discrete component.

DESCRIPTION OF EMBODIMENTS

For ease of understanding, an application scenario of embodiments of this application is first briefly described.

Figure 1:
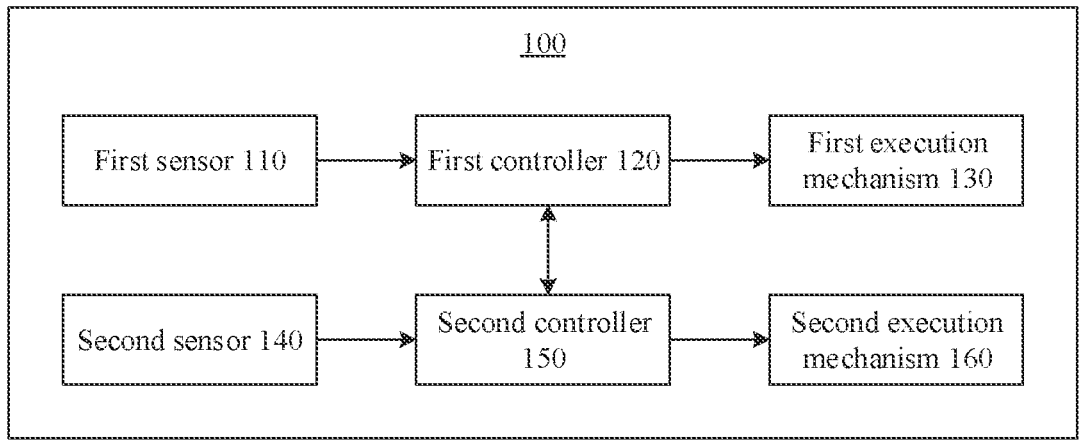
FIG. 1 is a schematic diagram of a redundant control system architecture.

FIG. 1 is a schematic diagram of a redundant control system architecture. As shown in FIG. 1, the redundant control system 100 includes two control branches. A first control branch includes a first sensor 110, a first controller 120, and a first execution mechanism 130. A second control branch includes a second sensor 140, a second controller 150, and a second execution mechanism 160. There is internal communication between the first controller 120 and the second controller 150.

The redundant control system 100 may be a steering control system, an anti-skid control system, a brake control system, or the like.

The first sensor 110 and/or the second sensor 140 are/is configured to detect working situation information of vehicle operation, and transmit the information to the first controller 120 and/or the second controller 150 in real time through an input interface, and may be, for example, a torque sensor and a steering angle sensor.

The first controller 120 and/or the second controller 150 are/is configured to perform corresponding decision-making and processing on received information according to an internal preconfigured control program, and output a control signal to the corresponding first execution mechanism 130 and/or the second execution mechanism 160 through an output interface of the first controller 120 and/or an output interface of the second controller 150. For example, the controller may be an electronic control unit (ECU), a domain control unit (DCU), or another controller that can be applied to a control system and has a control function.

The first execution mechanism 130 and/or the second execution mechanism 160 are/is configured to perform a corresponding operation according to a received control signal, to implement a predetermined function. For example, the execution mechanism may be a motor, or may be a component configured to execute a controller command, such as a pressure regulator.

For example, in a steering control system, the sensor may be a torque angle sensor, a controller may be an ECU, and an execution mechanism may be a motor.

A conventional control system uses the foregoing two control branches. In this case, in an operation process of a vehicle, if one control branch fails, the other control branch can still provide a control function. Based on the architecture of the foregoing redundant control system, in a conventional redundant control method, usually, one controller is preset as a primary controller, and the other controller is preset as a secondary controller. In this case, an initial state of the secondary controller is not a primary-controller state. After the two controllers are woken up and perform handshake, the system is activated. After the system starts to work, if the primary controller is faulty, the secondary controller is used. In this control manner, if the two controllers are not woken up synchronously or an initial state of one controller is faulty, the two controllers cannot perform handshake. As a result, the entire control system cannot be activated, and reliability of the control system is reduced.

Based on the foregoing problem, an embodiment of this application provides a control method. Before a control function of a first controller and/or a control function of a second controller are/is activated, the two controllers can determine, based on respective operating statuses, a primary-controller/secondary-controller mode through negotiation. In this way, regardless of whether both controllers are woken up synchronously or whether either of the controllers is faulty, both controllers can normally perform handshake to activate the control system. This improves autonomy and flexibility of determining the primary-controller/secondary-controller mode and improves reliability of a control system.

The following describes technical solutions in this application with reference to the accompanying drawings.

Figure 2:
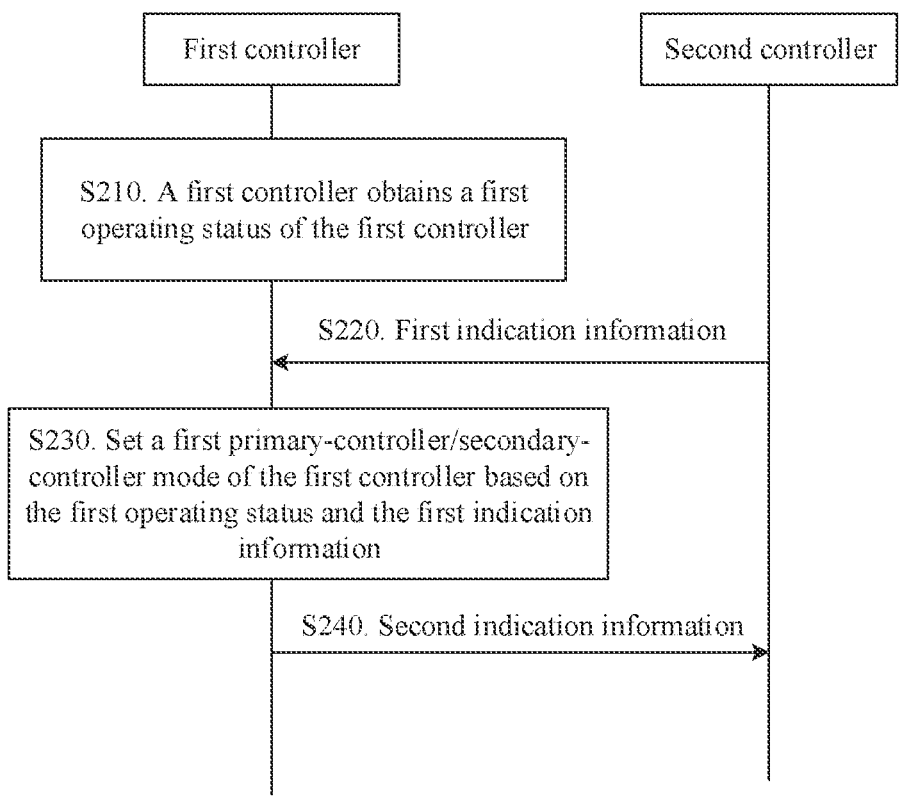
FIG. 2 is a schematic diagram of a control method according to an embodiment of this application.

FIG. 2 is a schematic diagram of a control method according to an embodiment of this application. The method 200 can be applied to a control system, and the control system includes a first controller and a second controller. For example, the method can be applied to the redundant control system 100 shown in FIG. 1, and is mainly applied before a control function of the first controller and/or a control function of the second controller are/is activated.

As shown in FIG. 2, the method 200 includes steps S210 to S240. The following describes these steps in detail.

S210. A first controller obtains a first operating status of the first controller.

Optionally, the first operating status of the first controller includes a faulty state of the first controller or a non-faulty state of the first controller.

Optionally, the first controller can obtain the first operating status of the first controller from a detection unit of the first controller, or from a detection component other than the first controller. For example, whether the first operating status is the faulty state or the non-faulty state can be obtained based on a detection result of another component. A manner of obtaining the first operating status of the first controller is not limited in this application.

S220. The first controller receives first indication information sent by the second controller.

It should be understood that the second controller may send the first indication information to the first controller, where the first indication information indicates that a status of the second controller is one of a primary-controller state, a secondary-controller state, or a primary-controller/secondary-controller pending state.

It should be understood that a state of the second controller may be determined by the second controller with reference to an operating status of the second controller. When the operating status of the second controller is a non-faulty state, the first indication information sent by the second controller may indicate that the status of the second controller is the primary-controller state, the secondary-controller state, or the primary-controller/secondary-controller pending state. Specifically, if the first controller is woken up before the second controller is woken up, after the second controller is woken up, the second controller first sends the primary-controller/secondary-controller pending state to the first controller. It should be understood that the primary-controller/secondary-controller pending state (also referred to as an "initial state") means that when the second controller enters the initial state after being woken up, whether the status of the second controller is the primary-controller state or the secondary-controller state is not determined. If the second controller does not receive indication information of the first controller after being woken up, and the operating status of the second controller is the non-faulty state, the status of the second controller is the primary-controller state. If the operating status of the second controller is the non-faulty state, but indication information indicating that the first controller is a primary controller is first received, the status of the second controller is the secondary-controller state. When the operating status of the second controller is the faulty state, the first indication information sent by the second controller may indicate that the status of the second controller is the secondary-controller state. It should be further understood that when the operating status of the second controller is the faulty state, there are usually two working situations. One is that although the second controller is faulty, the second controller can still send indication information to indicate that the second controller is in the secondary-controller state. The other is that the second controller cannot send indication information because the second controller is faulty. A specific working situation is determined by a faulty component and fault severity. This is not specifically limited in this application.

It should be understood that the indication information may be sent by the second controller through a private channel between the first controller and the second controller, or through another channel that can connect the first controller and the second controller in the entire vehicle. This is not specifically limited in this application.

It should be understood that a sequence of steps S210 and S220 is not specifically limited in this embodiment of this application. The first controller may first obtain the first operating status of the first controller, or may first receive the first indication information sent by the second controller, or the steps S210 and S220 may be simultaneously performed.

S230. The first controller sets a first primary-controller/secondary-controller mode of the first controller based on the first operating status and the first indication information.

It should be understood that when the first controller receives the first indication information sent by the second controller, and the first indication information can clearly indicate the status of the second controller, the first controller may set the first primary-controller/secondary-controller mode of the first controller based on the first operating status and the first indication information.

Optionally, the first primary-controller/secondary-controller mode of the first controller includes a mode in which the first controller is the primary controller or a mode in which the first controller is the secondary controller.

It should be further understood that the first controller may flexibly set the first primary-controller/secondary-controller mode of the first controller based on the first operating status of the first controller and the first indication information with reference to an actual situation.

Optionally, if the first operating status is the faulty state, that the first controller sets a first primary-controller/secondary-controller mode of the first controller based on the first operating status and the first indication information includes: The first controller sets the first primary-controller/secondary-controller mode of the first controller to a mode in which the first controller is the secondary controller based on the first operating status and the first indication information. In other words, if the first operating status is the faulty state, the first primary-controller/secondary-controller mode of the first controller may be set to the secondary-controller mode. In this case, the status of the second controller indicated by the first indication information may not be considered.

Optionally, when the first indication information indicates that the status of the second controller is the primary-controller state, that the first controller sets a first primary-controller/secondary-controller mode of the first controller based on the first operating status and the first indication information includes: The first controller sets the first primary-controller/secondary-controller mode of the first controller to the mode in which the first controller is the secondary controller based on the first operating status and the first indication information. In other words, if the status of the second controller is the primary-controller state, it means that the second controller is not faulty. In this case, an operating status of the first controller may not be considered, and the first primary-controller/secondary-controller mode of the first controller may be set to the secondary-controller mode. Therefore, efficiency of determining the primary-controller/secondary-controller mode can be improved.

Optionally, when the first indication information indicates that the status of the second controller is the secondary-controller state or the primary-controller/secondary-controller pending state, and the first operating status is the non-faulty state, that the first controller sets a first primary-controller/secondary-controller mode of the first controller based on the first operating status and the first indication information includes: The first controller sets the first primary-controller/secondary-controller mode of the first controller to a mode in which the first controller is the primary controller based on the first operating status and the first indication information.

Optionally, when the first indication information indicates that the status of the second controller is the secondary-controller state or the primary-controller/secondary-controller pending state, and the first operating status of the first controller is the faulty state, the first primary-controller/secondary-controller mode of the first controller is set to the secondary-controller mode.

It should be understood that a controller in the faulty state is a secondary controller, and cannot be used as a standby controller in a system working process. Only a secondary controller in the non-faulty state can be used as the standby controller, so that a control system has a redundancy capability.

S240. The first controller sends second indication information to the second controller.

It should be understood that the second indication information indicates the first primary-controller/secondary-controller mode of the first controller, so that a first primary-controller/secondary-controller mode of the second controller that is set by the second controller does not conflict with the first primary-controller/secondary-controller mode of the first controller, where the first primary-controller/secondary-controller mode of the second controller includes a mode in which the second controller is the primary controller or a mode in which the second controller is the secondary controller.

In other words, after setting the first primary-controller/secondary-controller mode of the first controller, the first controller sends the second indication information to the second controller, to indicate the first primary-controller/secondary-controller mode of the first controller. The second controller may set the first primary-controller/secondary-controller mode of the second controller based on the received second indication information.

It should be understood that no conflict means that when the first primary-controller/secondary-controller mode of the first controller is the primary-controller mode, the first primary-controller/secondary-controller mode of the second controller is the secondary-controller mode; or when the first primary-controller/secondary-controller mode of the first controller is the secondary-controller mode, the first primary-controller/secondary-controller mode of the second controller is the primary-controller mode.

In this embodiment of this application, before the control function of the first controller and/or the control function of the second controller are/is activated, the first controller can obtain the operating status of the first controller, receive the first indication information sent by the second controller, and then set the first primary-controller/secondary-controller mode of the first controller based on the operating status of the first controller and the first indication information. The first controller can further send the first primary-controller/secondary-controller mode of the first controller to the second controller, so that the second controller can set the first primary-controller/secondary-controller mode of the second controller based on the first primary-controller/secondary-controller mode of the first controller. In this way, in the control system, the first controller and the second controller can determine the primary-controller/secondary-controller modes through negotiation. This improves flexibility of determining the primary-controller/secondary-controller mode. In addition, according to the solution in this embodiment of this application, synchronous wakeup of the two controllers is not needed to determine the primary-controller/secondary-controller mode. This avoids failure of activating the entire control system caused by failure of handshake by two controllers when the two controllers are not synchronously woken up, and improves reliability of the control system.

It should be understood that the foregoing solution is performed when the first controller successfully receives the first indication information, and the first indication information can clearly indicate the status of the second controller.

It should be further understood that, in an actual implementation, there is another situation: The first controller does not receive the first indication information, or the received first indication information is invalid. In this case, the first controller may set the primary-controller/secondary-controller mode of the first controller in the following manner.

Optionally, if the first controller does not receive the first indication information, or the received first indication information is invalid, the first controller sets a second primary-controller/secondary-controller mode of the first controller based on the first operating status.

When the first operating status is the faulty state, the second primary-controller/secondary-controller mode of the first controller is the mode in which the first controller is the secondary controller. When the first operating status is the non-faulty state, the second primary-controller/secondary-controller mode of the first controller is the mode in which the first controller is the primary controller.

It should be understood that the reason why the first controller does not receive the first indication information may be that the second controller is not woken up, or the second controller is faulty and cannot send the indication information. This is not limited in this application.

It should be understood that the first indication information being invalid refers to a situation in which the first controller receives the first indication information, but the first controller cannot determine the status of the second controller based on the received first indication information because there may be an exception in transmission of the first indication information.

Optionally, third indication information may be further sent by the first controller to the second controller, where the third indication information indicates the second primary-controller/secondary-controller mode of the first controller, so that the second primary-controller/secondary-controller mode of the second controller that is set by the second controller does not conflict with the second primary-controller/secondary-controller mode of the first controller. The second primary-controller/secondary-controller mode of the second controller includes the mode in which the second controller is the primary controller or the mode in which the second controller is the secondary controller.

In this case, if the first controller does not receive the first indication information, or the received first indication information is invalid, the first controller can still set the second primary-controller/secondary-controller mode of the first controller based on the operating status of the first controller. Then the second controller may also set the second primary-controller/secondary-controller mode of the second controller based on the second primary-controller/secondary-controller mode of the first controller, so that the primary-controller/secondary-controller modes of the two controllers do not conflict. The problem in the conventional technology that the entire control system cannot be activated because two controllers cannot perform handshake when an initial state of either of the two controllers is a faulty state can be avoided. This improves reliability of a control system.

In this embodiment of this application, the first controller may be determined as the primary controller based on a situation in which the second controller is in the primary-controller/secondary-controller pending state, the first indication information is not received, the first indication information is invalid, or the like. In this case, the second controller may not determine the primary-controller/secondary-controller mode of the second controller, or the second controller has determined the primary-controller/secondary-controller mode of the second controller as the primary-controller mode, but the first controller determines the first controller as the primary controller because the indication information is invalid. Therefore, to improve reliability of determining the primary-controller/secondary-controller mode, the primary-controller/secondary-controller mode of the first controller may be determined again in the following manner.

Figure 3:
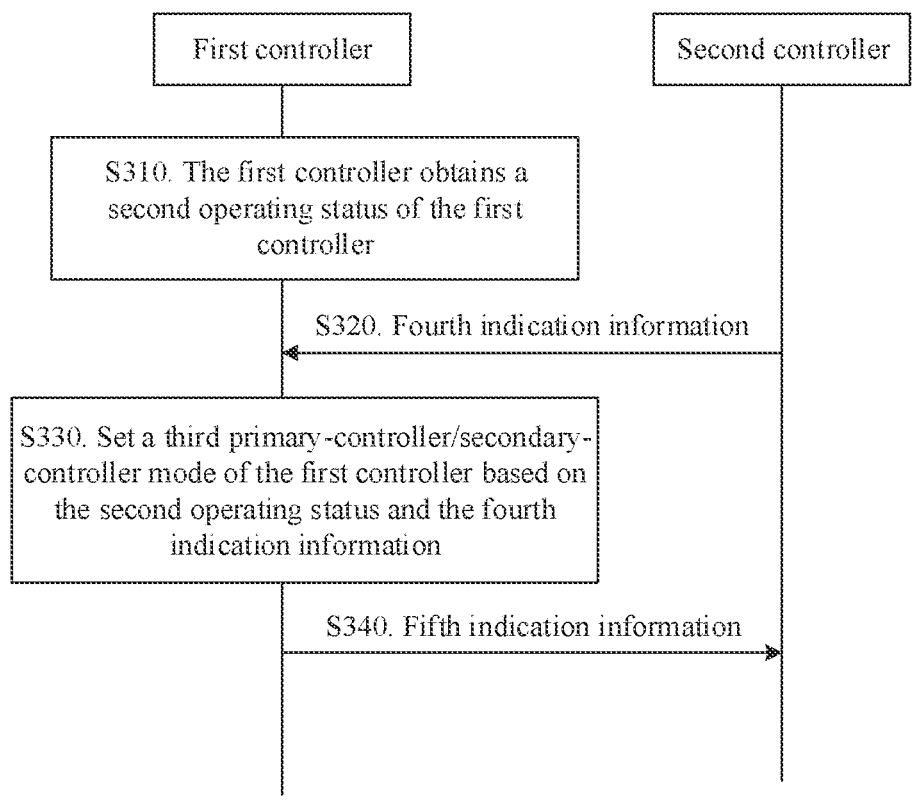
FIG. 3 is a schematic diagram of another control method according to an embodiment of this application.

Optionally, based on the foregoing method 200, if the first primary-controller/secondary-controller mode or the second primary-controller/secondary-controller mode of the first controller is the primary-controller mode, a method 300 shown in FIG. 3 may continue to be performed. FIG. 3 is a schematic diagram of another control method according to an embodiment of this application. The method 300 includes steps S310 to S340.

S310. The first controller obtains a second operating status of the first controller.

Optionally, the second operating status of the first controller includes a faulty state of the first controller or a non-faulty state of the first controller.

It should be understood that the first operating status and the second operating status of the first controller indicates operating statuses of the first controller at two different moments (at which a first primary-controller/secondary-controller mode and a third primary-controller/secondary-controller mode are determined). It should be understood that the second operating status of the first controller may be re-obtained by the first controller, or may be determined based on the first operating status. For example, if the first operating status of the first controller is in the non-faulty state, it is considered that the second operating status is also the non-faulty state.

S320. The first controller receives fourth indication information sent by the second controller.

It should be understood that the second controller may send the fourth indication information to the first controller, where the fourth indication information indicates that the status of the second controller is one of the primary-controller state, the secondary-controller state, or the primary-controller/secondary-controller pending state.

For other related descriptions, refer to step S220. Details are not described herein again.

S330. The first controller sets a third primary-controller/secondary-controller mode of the first controller based on the second operating status and the fourth indication information.

It should be understood that when the first controller receives the fourth indication information sent by the second controller, and the fourth indication information can clearly indicate the status of the second controller, the first controller may set the third primary-controller/secondary-controller mode of the first controller based on the second operating status and the fourth indication information.

Optionally, the third primary-controller/secondary-controller mode of the first controller includes the mode in which the first controller is the primary controller or the mode in which the first controller is the secondary controller.

It should be understood that when the first controller sets the third primary-controller/secondary-controller mode of the first controller, the first primary-controller/secondary-controller mode or the second primary-controller/secondary-controller mode of the first controller is adjusted to the third primary-controller/secondary-controller mode.

It should be further understood that the first controller may flexibly set the third primary-controller/secondary-controller mode of the first controller based on the second operating status of the first controller and the fourth indication information with reference to an actual situation.

Optionally, if the second operating status is the faulty state, that the first controller sets a third primary-controller/secondary-controller mode of the first controller based on the second operating status and the fourth indication information includes: The first controller sets the third primary-controller/secondary-controller mode of the first controller to the mode in which the first controller is the secondary controller based on the second operating status and the fourth indication information. In other words, if the second operating status is the faulty state, the third primary-controller/secondary-controller mode of the first controller may be set to the secondary-controller mode. In this case, the status of the second controller indicated by the fourth indication information may not be considered.

When the first primary-controller/secondary-controller mode or the second primary-controller/secondary-controller mode of the first controller is the primary-controller mode, the fourth indication information received during determining the primary-controller/secondary-controller mode for the second time indicates that the status of the second controller is the primary-controller state. As a result, the primary-controller/secondary-controller mode of the first controller cannot be determined during determining the primary-controller/secondary-controller mode for the second time. Therefore, a priority of the controller is introduced for the determining. The third primary-controller/secondary-controller mode of the first controller is determined based on a priority. This improves efficiency and reliability of determining the primary-controller/secondary-controller mode.

Optionally, when a priority of setting the first controller as the primary controller is lower than a priority of setting the second controller as the primary controller, and the fourth indication information indicates that the status of the second controller is the primary-controller state, that the first controller sets a third primary-controller/secondary-controller mode of the first controller based on the second operating status and the fourth indication information includes: The first controller sets the third primary-controller/secondary-controller mode of the first controller to the mode in which the first controller is the secondary controller based on the second operating status and the fourth indication information.

Optionally, when the priority of setting the first controller as the primary controller is higher than a priority of setting the second controller as the primary controller, and the fourth indication information indicates that the status of the second controller is the primary-controller state, that the first controller sets a third primary-controller/secondary-controller mode of the first controller based on the second operating status and the fourth indication information includes: The first controller sets the third primary-controller/secondary-controller mode of the first controller to the mode in which the first controller is the primary controller based on the second operating status and the fourth indication information.

It should be understood that the priority of the controller may be preset. For example, a priority of the first controller may be higher than that of the second controller by default.

Optionally, when the fourth indication information indicates that the status of the second controller is the secondary-controller state or the primary-controller/secondary-controller pending state, that the first controller sets a third primary-controller/secondary-controller mode of the first controller based on the second operating status and the fourth indication information includes: The first controller sets the third primary-controller/secondary-controller mode of the first controller to the mode in which the first controller is the primary controller based on the second operating status and the fourth indication information.

S340. The first controller sends fifth indication information to the second controller.

It should be understood that the fifth indication information indicates the third primary-controller/secondary-controller mode of the first controller, so that a third primary-controller/secondary-controller mode of the second controller that is set by the second controller does not conflict with the third primary-controller/secondary-controller mode of the first controller. The third primary-controller/secondary-controller mode of the second controller includes the mode in which the second controller is the primary controller or the mode in which the second controller is the secondary controller.

In other words, after setting the third primary-controller/secondary-controller mode of the first controller, the first controller sends the fifth indication information to the second controller, to indicate the third primary-controller/secondary-controller mode of the first controller. The second controller may set the third primary-controller/secondary-controller mode of the second controller based on the received fifth indication information.

It should be understood that no conflict means that when the third primary-controller/secondary-controller mode of the first controller is the primary-controller mode, the third primary-controller/secondary-controller mode of the second controller is the secondary-controller mode; or when the third primary-controller/secondary-controller mode of the first controller is the secondary-controller mode, the third primary-controller/secondary-controller mode of the second controller is the primary-controller mode.

It should be understood that the foregoing solution is performed when the first controller successfully receives the fourth indication information, and the fourth indication information can clearly indicate the status of the second controller.

It should be further understood that, in an actual implementation, there is another situation: The first controller does not receive the fourth indication information, or the received fourth indication information is invalid. In this case, the first controller may set the primary-controller/secondary-controller mode of the first controller in the following manner.

Optionally, if the first controller does not receive the fourth indication information, or the received fourth indication information is invalid, the first controller sets a fourth primary-controller/secondary-controller mode of the first controller based on the second operating status.

It should be understood that when the first controller sets the fourth primary-controller/secondary-controller mode of the first controller, the first primary-controller/secondary-controller mode or the second primary-controller/secondary-controller mode of the first controller is adjusted to the fourth primary-controller/secondary-controller mode.

When the second operating status is the faulty state, the fourth primary-controller/secondary-controller mode of the first controller is the mode in which the first controller is the secondary controller. When the second operating status is the non-faulty state, the fourth primary-controller/secondary-controller mode of the first controller is the mode in which the first controller is the primary controller.

Optionally, sixth indication information may be further sent by the first controller to the second controller, where the sixth indication information indicates the fourth primary-controller/secondary-controller mode of the first controller, so that the fourth primary-controller/secondary-controller mode of the second controller that is set by the second controller does not conflict with the fourth primary-controller/secondary-controller mode of the first controller. The fourth primary-controller/secondary-controller mode of the second controller includes the mode in which the second controller is the primary controller or the mode in which the second controller is the secondary controller.

In this embodiment of this application, during determining the primary-controller/secondary-controller mode for the second time, if situations such as the fourth indication information still being invalid, or the second controller being in the pending state occur, and the second operating status is the non-faulty state, the fourth primary-controller/secondary-controller mode of the first controller may be directly set to the primary-controller mode, and determining is not performed again. This can reduce determining time.

Optionally, at least one of the first indication information, the second indication information, the third indication information, the fourth indication information, the fifth indication information, and the sixth indication information includes signals of consecutive frames, for example, signals of three consecutive frames, five consecutive frames, or ten consecutive frames. In this application, using a plurality of consecutive frames can improve reliability of information and accuracy of determining the primary-controller/secondary-controller mode.

It should be understood that longer signals of consecutive frames results in higher accuracy and more determining time. It should be understood that quantities of frames of the first indication information, the second indication information, the third indication information, the fourth indication information, the fifth indication information, and the sixth indication information may be the same. For example, all the pieces of information may include three consecutive frames or five consecutive frames. Alternatively, the quantities of frames may be different. For example, the first indication information includes three consecutive frames, and the second indication information includes five consecutive frames. This is not specifically limited in this application. Preferably, in the solution in this embodiment of this application, signals of three consecutive frames are used.

Optionally, the first controller and the second controller are controllers in a steering system.

It should be understood that, after the primary-controller/secondary-controller mode determining process is completed, when a final primary-controller/secondary-controller mode is determined, the controller is still in a standby state, and can be switched to an activated or on-call state only when an operating parameter of the control system meets a specific condition. When the controller determines that the operating parameter of the control system no longer meets an activation condition, the controller may adjust the control function from the activated state or the on-call state to the standby state. It should be understood that the on-call state refers to a state in which the activation condition of the control function is met, but the function can be fully activated only when other conditions are met because the controller is the secondary controller and is in the standby state, for example, the controller can be fully activated only when the primary controller is faulty.

Optionally, if a final primary-controller/secondary-controller mode of the first controller is the primary-controller mode, the method 200 or 300 further includes: The first controller activates a steering function if an operating parameter that is of a steering mechanism in the steering system and that is obtained by the first controller meets a steering function activation condition.

For example, in the steering system, when a vehicle rotation speed reaches a specific threshold and a system operation condition meets a steering requirement, a primary controller in the standby state activates the steering system, so that the primary controller controls the execution of the steering function. When steering is not required, the rotation speed is lower than a specific threshold. In this case, the activation state is switched to the standby state.

Optionally, if a final primary-controller/secondary-controller mode of the first controller is the secondary-controller mode, and a current operating state of the first controller is the non-faulty state, the method 200 or 300 further includes: The first controller controls the first controller to be in the on-call state if an operating parameter that is of a steering mechanism in the steering system and that is obtained by the first controller meets a steering function activation condition.

Optionally, if the operating status of the first controller is the faulty state, the first primary-controller/secondary-controller mode is the secondary-controller mode, and the first controller is in a system fault state. In this case, the faulty controller cannot be used as the standby controller when the system is working.

Optionally, before the system starts to work, the first controller may check the operating status of the first controller in real time. The first controller adjusts the primary-controller/secondary-controller mode in time when detecting a fault, or adjusts the primary-controller/secondary-controller mode in time based on an operating status of the other party.

According to the control method provided in this embodiment of this application, before the system starts to work, a first controller can determine a primary-controller/secondary-controller mode based on a status of the first controller and a status of the other party, so that a control system can be normally activated and starts working. In this way, reliability of the control system is improved.

It should be understood that, in this embodiment of this application, the first controller and the second controller in the control system can perform the same control method 200 or 300, operate independently after being powered on and woken up, and negotiate with each other to determine the primary-controller/secondary-controller mode. In other words, the first controller can set the primary-controller/secondary-controller mode based on the operating status of the first controller and the indication information sent by the second controller, and the second controller can also set the primary-controller/secondary-controller mode based on the operating status of the second controller and the indication information sent by the first controller.

It should be understood that there are usually a specific time difference between wakeup of two controllers and a specific time difference between sending indication information to each other in an actual implementation and operation process. This means that one controller usually first receives indication information from the other controller. In this case, a controller that receives the indication information may set a primary-controller/secondary-controller mode according to the foregoing method. If a controller does not receive the indication information after being woken up, the controller may also set a primary-controller/secondary-controller mode based on an operating status of the controller. For example, if the first controller is woken up first, and sends the indication information to the second controller after being initialized, after the second controller is woken up and receives the indication information sent by the first controller, the second controller may set the primary-controller/secondary-controller mode based on the indication information sent by the first controller and the operating status of the second controller. Alternatively, if the first controller is woken up first, but the first controller is faulty and cannot send the indication information, the first controller sets the first controller as the secondary controller. After the second controller is woken up, the second controller may set the primary-controller/secondary-controller mode based on the operating status of the second controller because the second controller does not receive the indication information of the first controller. When the operating status of the second controller is the non-faulty state, the second controller sets the primary-controller/secondary-controller mode to the primary-controller mode, and sends the indication information to the first controller. It should be understood that a plurality of working situations may occur in actual application of this embodiment of this application. For a specific method for determining the primary-controller/secondary-controller mode, refer to the foregoing plurality of example cases. Details are not described herein again.

For example, there is an extreme working situation in which the indication information sent by the first controller to the second controller indicates that the status of the first controller is the primary-controller/secondary-controller pending state, the indication information sent by the second controller to the first controller indicates that the status of the second controller is also the primary-controller/secondary-controller pending state, and the operating statuses of the two controllers is the non-faulty state. In this case, based on the indication information from each other and the operating statuses of the first controller and the second controller, both the primary-controller/secondary-controller modes of the two controllers set respectively by the first controller and the second controller may be the primary-controller mode. Therefore, the first controller and the second controller need to continue to send indication information to each other to adjust the primary-controller/secondary-controller modes. In this case, if the first controller first receives the indication information sent by the second controller, but the indication information is invalid, the primary-controller/secondary-controller mode of the first controller is still the primary-controller mode, and the primary-controller/secondary-controller mode of the second controller is adjusted to the secondary-controller mode. If the first controller first receives information sent by the second controller that the status of the second controller is the primary-controller state, and the priority of the first controller is high, the primary-controller/secondary-controller mode of the first controller is still the primary-controller mode, and the primary-controller/secondary-controller mode of the second controller is adjusted to the secondary-controller mode. If the first controller first receives information sent by the second controller that the status of the second controller is the primary-controller state, and the priority of the first controller is low, the primary-controller/secondary-controller mode of the first controller is adjusted to the secondary-controller mode, and the second controller is still the primary controller. If an extreme working situation occurs during sending the indication information for the second time, for example, indication information received from each other is invalid information, a controller with a higher priority is still the primary controller, and the other controller is adjusted as the secondary controller.

In this embodiment of this application, before the foregoing control method is performed, the two controllers first need to be powered on and woken up. A controller that is woken up first may send indication information first, and a controller that is woken up later may set a primary-controller/secondary-controller mode based on the indication information sent by the controller that is woken up first. In addition, when one controller is faulty, the other controller can also set the primary-controller/secondary-controller mode based on an operating status of the controller, to avoid a problem in the conventional control method that a system cannot be activated when two controllers are not woken up synchronously, or one controller is faulty.

Figure 4:
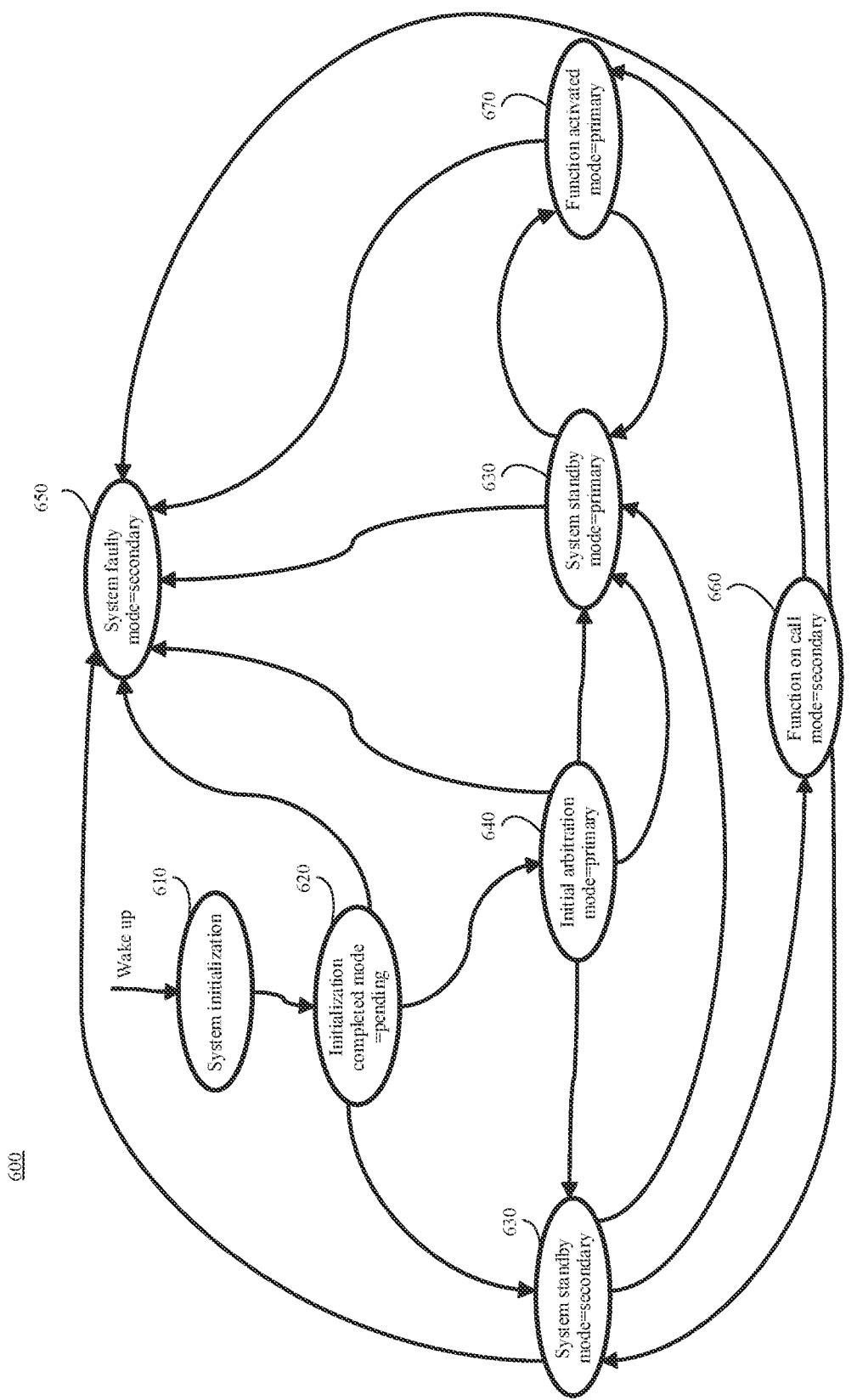
FIG. 4 is a schematic diagram of a method for determining a primary-controller/secondary-controller mode according to an embodiment of this application.

In a specific implementation, FIG. 4 is an example diagram of a primary-controller/secondary-controller mode determining method according to an embodiment of this application. As shown in FIG. 4, a method 600 includes a process in which a first controller and/or a second controller switch between seven working states 610 to 670 during determining a primary-controller/secondary-controller mode. The method 600 may be applied to the first controller and/or the second controller, to implement a process in which the first controller and the second controller set respective primary-controller/secondary-controller modes after being powered on and initialized.

The following describes the method 600 in detail by using the first controller as an example.

After the first controller is woken up after being powered on, a working status is system initialization 610. After the first controller is initialized, the working status of the first controller is switched to initialization completed 620. In this case, the primary-controller/secondary-controller mode of the first controller is a primary-controller/secondary-controller pending state, that is, a state in which a primary-controller/secondary-controller state is not determined.

When a status of the first controller is initialization completed 620, if at least one of received three consecutive frames of information sent by the second controller indicates that the second controller is a primary controller, the working status of the first controller is switched to system standby 630, and the primary-controller/secondary-controller mode is a secondary-controller mode; if the information sent by the second controller is not received, or all of the received three consecutive frames of information sent by the second controller indicate that the second controller is a non-primary controller (which includes three ceases: indicating that the second controller is the secondary controller, indicating that the primary-controller/secondary-controller state of the second controller is not determined, or the received information is invalid), the working status of the first controller is switched to initial arbitration 640, and the primary-controller/secondary-controller mode is a primary-controller mode; and if the first controller learns that an operating status of the first controller is a faulty state, the working status of the first controller is switched to system faulty 650, and the primary-controller/secondary-controller mode is the secondary-controller mode.

The second controller sends information to the first controller through private communication or external communication. The private communication is communication performed through an internal channel between the first controller and the second controller, and the external communication is communication performed through a channel connecting the first controller and the second controller in a vehicle.

When the working status of the first controller is initial arbitration 640, and the primary-controller/secondary-controller mode is the primary-controller mode, if at least one of received three consecutive frames of information continuously sent by the second controller indicates that the second controller is the primary controller, and a priority of the first controller is higher than that of the second controller, the working status of the first controller is switched to system standby 630, and the primary-controller/secondary-controller mode is the primary-controller mode; if at least one of the received three consecutive frames of information continuously sent by the second controller indicates that the second controller is the primary controller, and the priority of the first controller is lower than that of the second controller, the working status of the first controller is switched to system standby 630, and the primary-controller/secondary-controller mode is the secondary-controller mode; if the information sent by the second controller is not received, or all of the received three consecutive frames of information continuously sent by the second controller indicate that the second controller is a non-primary controller (which includes three ceases: indicating that the second controller is the secondary controller, indicating that the primary-controller/secondary-controller state of the second controller is not determined, or the received information is invalid), the working status of the first controller is switched to system standby 630, and the primary-controller/secondary-controller mode is the primary-controller mode; and if the first controller learns that an operating status of the first controller is a faulty state, the working status of the first controller is switched to system faulty 650, and the primary-controller/secondary-controller mode is the secondary-controller mode.

When the working status of the first controller is system standby 630, and the primary-controller/secondary-controller mode is the secondary-controller mode, if a working status of the second controller sent by the second controller is received and is the system-faulty state, the working status of the first controller is switched to system standby 630, and the primary-controller/secondary-controller mode is the primary-controller mode; if it is found during external communication that an operating parameter of a control system meets an activation condition of a control function of the first controller, the working status of the first controller is switched to function on call 660, and the primary-controller/secondary-controller mode is the secondary-controller mode; and if the first controller learns that the operating status of the first controller is the faulty state, the working status of the first controller is switched to system faulty 650, and the primary-controller/secondary-controller mode is secondary-controller mode.

When the working status of the first controller is system standby 630, and the primary-controller/secondary-controller mode is the primary-controller mode, if it is found during external communication that an operating parameter of a control system meets an activation condition of a control function of the first controller, the working status of the first controller is switched to function activated 670, and the primary-controller/secondary-controller mode is the primary-controller mode; and if the first controller learns that the operating status of the first controller is the faulty state, the working status of the first controller is switched to system faulty 650, and the primary-controller/secondary-controller mode is the secondary-controller mode.

When the working status of the first controller is function activated 670, and the primary-controller/secondary-controller mode is the primary-controller mode, if it is found during external communication that an operating parameter of a control system no longer meets an activation condition of a control function of the first controller, the working status of the first controller is switched to system standby 630, and the primary-controller/secondary-controller mode is the primary-controller mode; and if the first controller learns that the operating status of the first controller is the faulty state, the working status of the first controller is switched to system faulty 650, and the primary-controller/secondary-controller mode is secondary-controller mode.

When the working status of the first controller is function on call 660, and the primary-controller/secondary-controller mode is the primary-controller mode, if the working status of the second controller sent by the second controller is received and is the system-faulty state, the working status of the first controller is switched to function activated 670, and the primary-controller/secondary-controller mode is the primary-controller mode; if it is found during external communication that an operating parameter of a control system no longer meets an activation condition of a control function of the first controller, the working status of the first controller is switched to system standby 630, and the primary-controller/secondary-controller mode is the secondary-controller mode; and if the first controller learns that the operating status of the first controller is the faulty state, the working status of the first controller is switched to system faulty 650, and the primary-controller/secondary-controller mode is the secondary-controller mode.

In this embodiment, seven controller working states are defined, so that the first controller and the second controller can perform automatic switching between the working states based on same logic, thereby improving autonomy of determining the primary-controller/secondary-controller mode and reliability and speed of switching.

After the primary-controller/secondary-controller modes of the first controller and the second controller are determined, in a conventional control manner, the primary controller needs to take over a control function of the control system, and control a corresponding execution mechanism, so that the execution mechanism corresponding to the primary controller can perform execution according to a total control requirement calculated by the primary controller. In this case, a requirement for performance of a single execution mechanism is high. In addition, when the primary controller controls operation of the corresponding execution mechanism, the secondary controller is in a standby state, which results in low utilization of the other controller and the execution mechanism.

In the conventional technology, a method of requirement allocation is used, so that utilization of two controllers and two execution mechanisms in a control system is balanced. A specific implementation is as follows: A first controller and a second controller calculate respective total control requirements that currently need to be output by the entire system, and allocate the respective calculated total control requirements to the first controller and the second controller according to a specific proportion (for example, the first total control requirement calculated by the first controller is K1, the second total control requirement calculated by the second controller is K2, and when allocation is performed according to a proportion of 1:1, the control requirement of the first controller is 0.5K1, a control requirement of the second controller is 0.5K2). However, in actual implementation, factors such as input signal transmission and detection of the two controllers are different. This may cause inconsistency of the calculated total control requirements and asynchronous requirement output. In addition, when values of K1 and K2 are not equal, a total output may not reach a required output. For the foregoing reasons, the requirement allocation solution in the conventional technology causes unsmooth output of a redundant control system.

Figure 5:
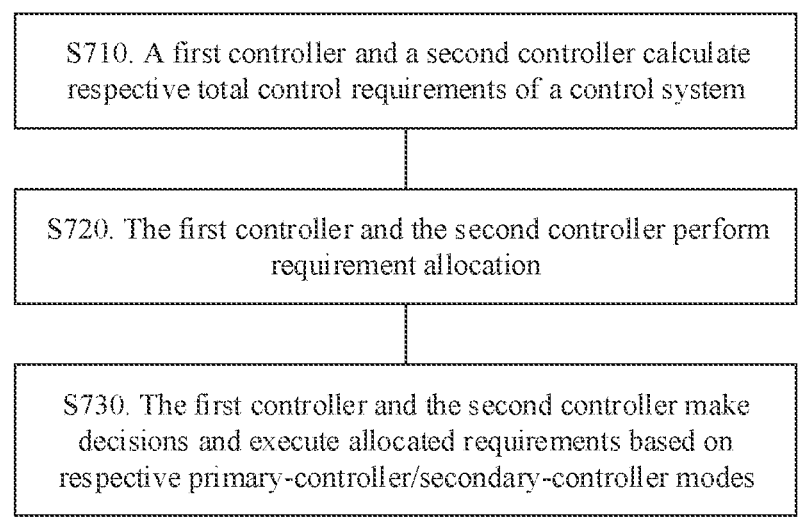
FIG. 5 is a schematic flowchart of a method for requirement allocation and decision-making according to an embodiment of this application.
Figure 6:
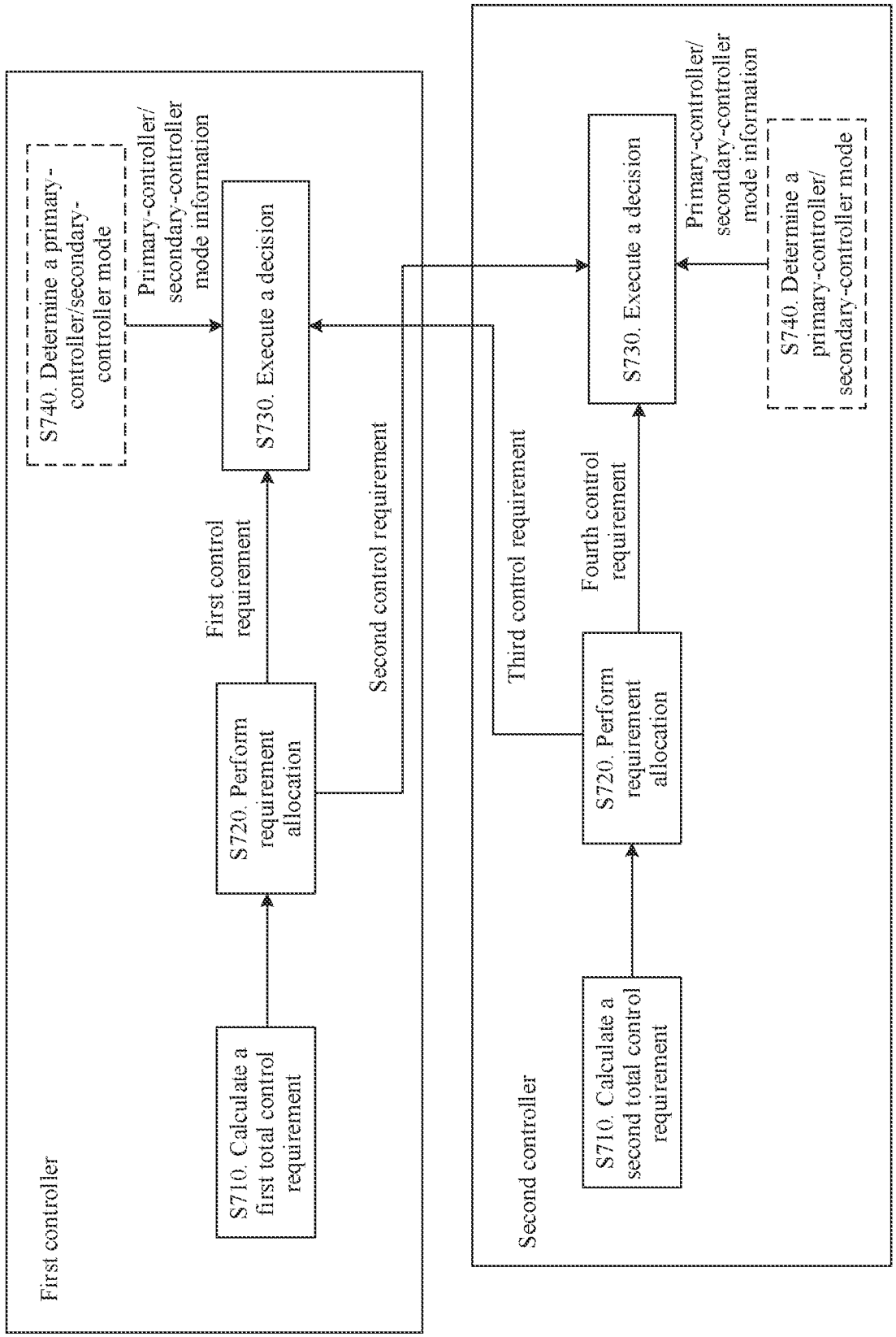
FIG. 6 is a block diagram of a method for requirement allocation and decision-making according to an embodiment of this application.

In view of this, this application provides a method for requirement allocation and decision-making applied to a control system. The control system includes a first controller and a second controller. The method may also be applied to the redundant control system 100 shown in FIG. 1. FIG. 5 is an example flowchart of a requirement allocation and decision-making method according to an embodiment of this application. FIG. 6 is an example block diagram of a requirement allocation and decision-making method according to an embodiment of this application. As shown in FIG. 5 and FIG. 6, the method 700 includes steps S710, S720, and S730.

S710. The first controller and the second controller separately calculate a total control requirement of the control system.

It should be understood that before the total control requirement of the control system is calculated, the method 700 further includes: obtaining sensor information and network information. The sensor information is detected working situation information of vehicle operation, and the network information is vehicle network information, including a vehicle speed, a vehicle function request, and the like. The first controller and the second controller separately calculate the total control requirement of the control system based on the obtained sensor information and network information. For ease of description, a total control requirement calculated by the first controller is denoted as a first total control requirement, and a total control requirement calculated by the second controller is denoted as a second total control requirement.

S720. The first controller and the second controller perform requirement allocation.

Specifically, in a method 800 shown in FIG. 6, the first controller divides the first total control requirement into a first control requirement of the first controller and a second control requirement of the second controller. The second controller divides the second total control requirement into a third control requirement of the first controller and a fourth control requirement of the second controller.

The first controller and the second controller may allocate the total control requirement to the first controller and the second controller according to a specific proportion. For example, if the first total control requirement calculated by the first controller is A1, and allocation is performed according to a proportion of 3:7, the first control requirement is 0.3A1, and the second control requirement is 0.7A1. For example, if the second total control requirement calculated by the second controller is A2, and allocation is performed according to a proportion of 1:1, the third control requirement is 0.5A2, and the fourth control requirement is 0.5A2. A proportion division manner and an allocation proportion are not limited in this application.

It should be understood that an allocation proportion applied by the first controller to the first total control requirement may be the same as or different from an allocation proportion applied by the second controller to the second total control requirement. This is not limited in this application.

S730. The first controller and the second controller make decisions and execute allocated requirements based on respective primary-controller/secondary-controller modes.

The first controller and the second controller may perform execution based on a requirement allocated by a controller in a primary-controller mode. For example, if the first controller is a primary controller, the first controller decides to execute the first control requirement, and the second controller executes the second control requirement; or if the second controller is the primary controller, the first controller decides to execute the third control requirement, and the second controller decides to execute the fourth control requirement.

It should be understood that the primary-controller/secondary-controller modes of the first controller and the second controller may be determined by using a method of presetting primary-controller/secondary-controller modes in the conventional technology. For example, by default, the first controller is the primary controller, and the second controller is a secondary controller. Alternatively, the primary-controller/secondary-controller modes may be determined through negotiation between the two controllers as described in embodiments of this application, for example, the primary-controller/secondary-controller modes are determined according to the foregoing method 200 or 300.

It should be understood that if the primary-controller/secondary-controller modes of the first controller and the second controller are determined through negotiation between the first controller and the second controller as described in embodiments of this application, the method 700 or 800 further includes step S740: The first controller and the second controller determine the primary-controller/secondary-controller modes, for example, determine the primary-controller/secondary-controller modes according to the foregoing method 200 or 300.

An embodiment of this application provides a method for requirement allocation and decision-making. A total control requirement of a first controller is allocated to a first controller and a second controller according to a specific proportion, and a total control requirement of a second controller is also allocated to the first controller and the second controller according to a specific proportion. In actual implementation, the decision-making and execution are performed based on allocation by a primary controller. Compared with the conventional allocation method (the first controller and the second controller separately allocate respective total control requirements obtained through calculation to the first controller and the second controller according to a specific proportion, and perform execution), the requirement allocation and decision-making method achieves system torque synchronous output and improves smoothness of a redundant control system. In addition, in the conventional technology, only a primary controller controls a corresponding execution mechanism to implement total requirement output. However, according to the method of implementing joint control by the two controllers, a requirement for performance of an execution mechanism in a control system is low, and resource utilization can be improved. Therefore, vehicle costs are reduced.

The following uses a steering system that is based on a controller area network (CAN) communication protocol as an example to describe in detail a solution combining requirement allocation and decision-making with a primary-controller/secondary-controller mode determining method in this application with reference to accompanying drawings. It should be noted that, in this embodiment of this application, the foregoing communication protocol may alternatively be an Ethernet communication protocol or a FlexRay communication protocol. This is not limited in this embodiment of this application.

Figure 7:
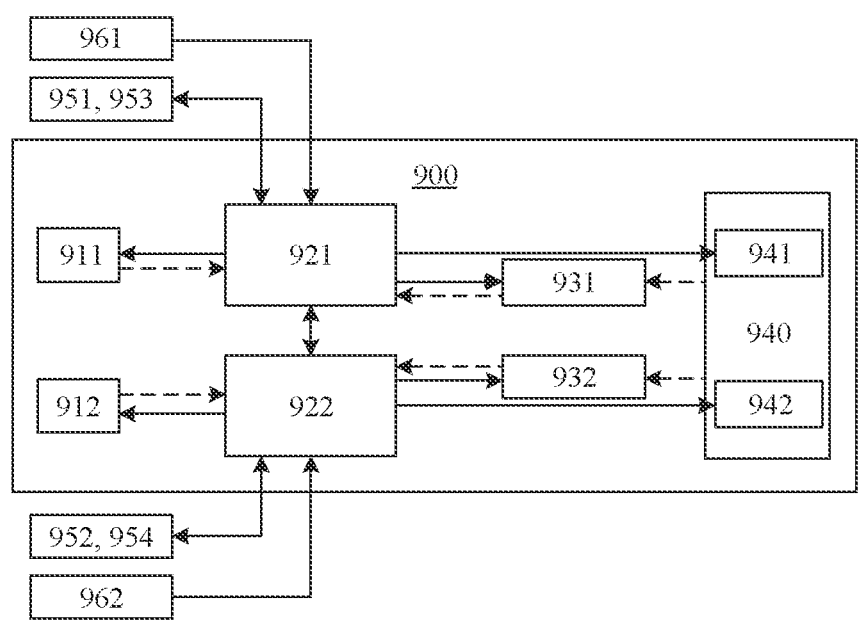
FIG. 7 is a schematic diagram of an architecture of a redundant steering control system according to an embodiment of this application.

FIG. 7 is a schematic diagram of an architecture of a redundant steering control system according to an embodiment of this application. As shown in FIG. 7, the redundant steering control system 900 includes, two torque angle sensors (TASs) (denoted as TAS 911 and TAS 912), two controllers (denoted as ECU 921 and ECU 922), two motor position sensors (motor position sensors, MPSs) (denoted as MPS 931 and MPS 932), and a double-winding motor 940.

The steering control system may receive two vehicle CANs and ignition (IG) wakeup signals (denoted as CAN 951, CAN 952, IG 953, and IG 954). In addition, the vehicle may be powered by two power supplies (denoted as a power supply 961 and a power supply 962). The double-winding motor 940 is a six-phase motor, including a three-phase motor 941 and a three-phase motor 942. In this case, the steering control system implements full redundant steering control.

It should be understood that the IG 953 and the IG 954 are configured to wake up the ECU 921 and the ECU 922. The TAS 911 and the TAS 912 are configured to collect a driver torque input and a steering wheel angle. The ECU 921 and the ECU 922 are configured to process received vehicle CAN information and sensor information, and send a control signal to the double-winding motor 940 through an output interface. The three-phase motor 941 and the three-phase motor 942 are configured to execute control signals of the ECU 921 and the ECU 922 respectively. The MPS 931 and the MPS 932 are configured to collect a position of a rotor of the double-winding motor 940. Internal communication exists between the ECU 921 and the ECU 922. It should be understood that the ECU 921 and the ECU 922 may obtain sensor information, or may control an information collection process of a sensor. This is not limited in this application.

Figure 8:
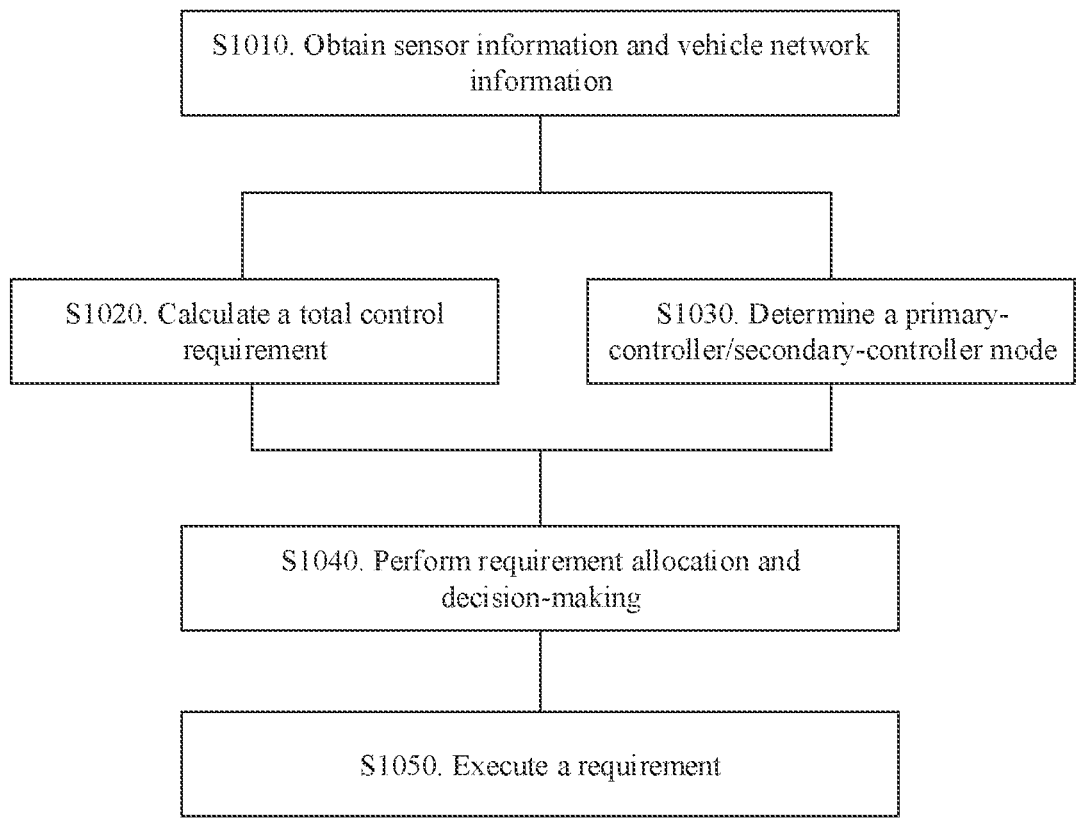
FIG. 8 is a schematic diagram of a steering control method according to an embodiment of this application.

As an example, FIG. 8 is a schematic diagram of a steering control method according to an embodiment of this application. The method 1000 may be applied to the redundant control system 100 shown in FIG. 1, or may be applied to the redundant steering control system shown in FIG. 7. It should be understood that, in this embodiment of this application, the ECU 921 and the ECU 922 perform the same steering control method 1000. As shown in FIG. 8, the method 1000 includes steps S1010 to S1050.

S1010. Obtain sensor information and vehicle network information.

It should be understood that, in actual implementation, the ECU 921 and the ECU 922 first obtain the IG 953 and the IG 954 wakeup signals from the vehicle to wake up the ECUs. The ECU 921 and the ECU 922 obtain the driver torque input information and the steering wheel angle information that are collected by the TAS 911 and the TAS 912, and obtain the network information of the CAN 951 and the CAN 952 from the vehicle, where the vehicle network information includes a vehicle speed, a vehicle function request, and the like.

S1020. Calculate a total control requirement.

It should be understood that the ECU 921 and the ECU 922 may simultaneously calculate required control requirements based on same control logic. Specifically, the ECU 921 calculates a first total control requirement of the control system based on the obtained TAS 911 and CAN 951 information; and the ECU 922 calculates a second total control requirement of the control system based on the obtained TAS 912 and CAN 952 information.

S1030. Determine a primary-controller/secondary-controller mode.

In the method 1000, for determining the primary-controller/secondary-controller mode, refer to the method 200 or 300 provided in embodiments of this application.

It should be understood that sequence of steps S1020 and S1030 is not limited, and steps S1020 and S1030 may be performed simultaneously or sequentially. This is not limited.

S1040: Perform requirement allocation and decision-making.

It should be understood that the ECU 921 and the ECU 922 may allocate the calculated total control requirements to both of the ECU 921 and the ECU 922.

Specifically, the ECU 921 may divide the first total control requirement into a first control requirement allocated to the ECU 921 and a second control requirement allocated to the ECU 922, and the ECU 922 may divide the second total control requirement into a third control requirement allocated to the ECU 921 and a fourth control requirement allocated to the ECU 922, as shown in FIG. 6. For example, the first total control requirement calculated by ECU 921 is A1, and allocation is performed according to a proportion of 3:7. In this case, the first control requirement is 0.3A1, and the second control requirement is 0.7A1. The second total control requirement calculated by ECU 922 is A2, and allocation is performed according to a proportion of 1:1. In this case, the third control requirement is 0.5A2, and the fourth control requirement is 0.5A2. A proportion division manner and an allocation proportion are not limited in this application. It should be understood that, in a preferred manner, the allocation proportion is 1:1.

It should be understood that, after requirement allocation is completed, the ECU 921 and the ECU 922 may determine final control outputs based on respective primary-controller/secondary-controller modes.

For example, if it is determined in step S1030 that the ECU 921 is primary and the ECU 922 is secondary, the ECU 921 decides to execute the first control requirement, and the ECU 922 decides to execute the second control requirement; or if it is determined in step S1030 that the ECU 921 is secondary and the ECU 922 is primary, the ECU 921 decides to execute the third control requirement, and the ECU 922 decides to execute the fourth control requirement.

S1050: Execute the requirement.

It should be understood that the ECU 921 and the ECU 922 obtain respective positions of the rotor of the double-winding motor 940 collected by the MPS 931 and the MPS 932, and control, according to the decided requirements, the three-phase motor 941 and the three-phase motor 942 respectively to perform torque output.

It should be understood that, after receiving the requirement decision, the double-winding motor 940 may drive, according to the requirement decision, the motor to complete steering.

The following describes an actual working situation during system working process with reference to an example. It should be understood that, for ease of description, a situation in which the ECU 921 is primary is used for following description.

For example, in a normal working process of the system, the ECU 921 and the ECU 922 jointly control the six-phase motor (the ECU 921 controls the three-phase motor 941, and the ECU 922 controls the three-phase motor 942) to implement 100% output of the first total control requirement. If the ECU 921 is faulty, but the fault is not on a micro controller unit (MCU) or a drive circuit, a primary-controller/secondary-controller mode of the ECU 921 is switched from a primary-controller mode to a secondary-controller mode, and a primary-controller/secondary-controller mode of the ECU 922 is switched from the secondary-controller mode to the primary-controller mode. In this case, the ECU 921 and ECU 922 jointly control the six-phase motor (the ECU 921 controls the three-phase motor 941, and the ECU 922 controls the three-phase motor 942) to achieve 100% output of the second total control requirement. If the ECU 921 is faulty, and the fault is on the MCU or the drive circuit, the primary-controller/secondary-controller mode of the ECU 921 is switched from the primary-controller mode to the secondary-controller mode, and the primary-controller/secondary-controller mode of the ECU 922 is switched from the secondary-controller mode to the primary-controller mode. In this case, the ECU 922 controls the three-phase motor 942 to achieve 100% output of the second total control requirement.

It should be understood that a fault of the MCU or the drive circuit affects requirement decision-making and execution of the ECU. Therefore, if a fault occurs, another ECU needs to output the total control requirement. However, if the fault is not on the MCU or the drive circuit, the ECU can still decide to execute a requirement allocated by the other ECU.

According to the steering control method 1000 provided by this embodiment of this application, a total control requirement of a first controller and a total control requirement of a second controller can be allocated to the first controller and the second controller according to a specific proportion. In actual implementation, decision-making and execution are carried out based on allocation by the primary controller. This achieves system torque synchronous output and improves smoothness of a redundant control system. In addition, before working, primary-controller/secondary-controller modes can be determined based on a state of one controller and a state of the other controller, so that the two controllers can normally perform handshake and the control system can be activated, and after the controllers start working, system torque is not affected during primary-controller/secondary-controller mode switch.

The foregoing describes in detail the control methods in embodiments of this application with reference to FIG. 1 to FIG. 8. The following describes in detail apparatuses in embodiments of this application with reference to FIG. 9 to FIG. 11. It should be noted that the apparatuses shown in FIG. 9 to FIG. 11 may implement the steps in the foregoing methods. For brevity, details are not described herein again.

Figure 9:
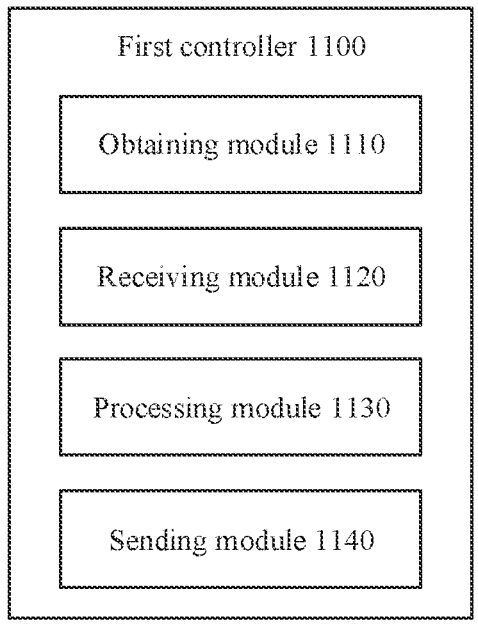
FIG. 9 is a schematic diagram of a first controller according to an embodiment of this application.

FIG. 9 is a schematic diagram of a first controller according to an embodiment of this application. The first controller 1100 can be configured to perform the method 200 or 300. As shown in FIG. 9, the first controller includes an obtaining module 1110, a receiving module 1120, a processing module 1130, and a sending module 1140.

The obtaining module 1110 is configured to obtain a first operating status of the first controller, where the first operating status includes a faulty state or a non-faulty state. The receiving module 1120 is configured to receive first indication information sent by a second controller, where the first indication information indicates that a status of the second controller is one of a primary-controller state, a secondary-controller state, or a primary-controller/secondary-controller pending state. The processing module 1130 is configured to set a first primary-controller/secondary-controller mode of the first controller based on the first operating status and the first indication information, where the first primary-controller/secondary-controller mode of the first controller includes a mode in which the first controller is a primary controller or a mode in which the first controller is a secondary controller. The sending module 1140 is configured to send second indication information to the second controller, where the second indication information indicates the first primary-controller/secondary-controller mode of the first controller, so that a first primary-controller/secondary-controller mode of the second controller that is set by the second controller does not conflict with the first primary-controller/secondary-controller mode of the first controller; and the first primary-controller/secondary-controller mode of the second controller includes a mode in which the second controller is the primary controller or a mode in which the second controller is the secondary controller.

Optionally, when the receiving module 1120 does not receive the first indication information or the received first indication information is invalid, the processing module 1130 is further configured to set a second primary-controller/secondary-controller mode of the first controller based on the first operating status, where when the first operating status is a faulty state, the second primary-controller/secondary-controller mode of the first controller is the mode in which the first controller is the secondary controller, or when the first operating status is a non-faulty state, the second primary-controller/secondary-controller mode of the first controller is the mode in which the first controller is the primary controller; and the sending module 1140 is further configured to send third indication information to the second controller, where the third indication information indicates the second primary-controller/secondary-controller mode of the first controller, so that a second primary-controller/secondary-controller mode of the second controller that is set by the second controller does not conflict with the second primary-controller/secondary-controller mode of the first controller; and the second primary-controller/secondary-controller mode of the second controller includes the mode in which the second controller is the primary controller or the mode in which the second controller is the secondary controller.

Optionally, if the first operating status is the faulty state, the processing module 1130 is further configured to set the first primary-controller/secondary-controller mode of the first controller to the mode in which the first controller is the secondary controller based on the first operating status and the first indication information.

Optionally, when the first indication information indicates that the status of the second controller is the primary-controller state, the processing module 1130 is further configured to set the first primary-controller/secondary-controller mode of the first controller to the mode in which the first controller is the secondary controller based on the first operating status and the first indication information.

Optionally, when the first indication information indicates that the status of the second controller is the secondary-controller state or the primary-controller/secondary-controller pending state, and the first operating status is the non-faulty state, the processing module 1130 can be further configured to set the first primary-controller/secondary-controller mode of the first controller to the mode in which the first controller is the primary controller based on the first operating status and the first indication information.

Optionally, when the first controller is the primary controller, the obtaining module 1110 may be further configured to obtain a second operating status of the first controller, where the second operating status includes a faulty state or a non-faulty state; the receiving module 1120 may be further configured to receive fourth indication information sent by the second controller, where the fourth indication information indicates that the status of the second controller is one of the primary-controller state, the secondary-controller state, or the primary-controller/secondary-controller pending state; the processing module 1130 may be further configured to set a third primary-controller/secondary-controller mode of the first controller based on the second operating status and the fourth indication information, where the third primary-controller/secondary-controller mode of the first controller includes the mode in which the first controller is the primary controller or the mode in which the first controller is the secondary controller; and the sending module 1140 is further configured to send fifth indication information to the second controller, where the fifth indication information indicates the third primary-controller/secondary-controller mode of the first controller, so that a third primary-controller/secondary-controller mode of the second controller that is set by the second controller does not conflict with the third primary-controller/secondary-controller mode of the first controller; and the third primary-controller/secondary-controller mode of the second controller includes the mode in which the second controller is the primary controller or the mode in which the second controller is the secondary controller.

Optionally, when the first controller does not receive the fourth indication information or the received fourth indication information is invalid, the processing module 1130 is further configured to set a fourth primary-controller/secondary-controller mode of the first controller based on the second operating status, where when the second operating status is the faulty state, the fourth primary-controller/secondary-controller mode of the first controller is the mode in which the first controller is the secondary controller, or when the second operating status is the non-faulty state, the fourth primary-controller/secondary-controller mode of the first controller is the mode in which the first controller is the primary controller; and the sending module 1140 is further configured to send sixth indication information to the second controller, where the sixth indication information indicates the fourth primary-controller/secondary-controller mode of the first controller, so that a fourth primary-controller/secondary-controller mode of the second controller that is set by the second controller does not conflict with the fourth primary-controller/secondary-controller mode of the first controller; and the fourth primary-controller/secondary-controller mode of the second controller includes the mode in which the second controller is the primary controller or the mode in which the second controller is the secondary controller.

Optionally, if the second operating status is the faulty state, the processing module 1130 is further configured to set the third primary-controller/secondary-controller mode of the first controller to the mode in which the first controller is the secondary controller based on the second operating status and the fourth indication information.

Optionally, when a priority of setting the first controller as the primary controller is lower than a priority of setting the second controller as the primary controller, and the fourth indication information indicates that the status of the second controller is the primary-controller state, the processing module 1130 may be further configured to set the third primary-controller/secondary-controller mode of the first controller to the mode in which the first controller is the secondary controller based on the second operating status and the fourth indication information.

Optionally, when a priority of setting the first controller as the primary controller is higher than a priority of setting the second controller as the primary controller, and the fourth indication information indicates that the status of the second controller is the primary-controller state, the processing module 1130 may be further configured to set the third primary-controller/secondary-controller mode of the first controller to the mode in which the first controller is the primary controller based on the second operating status and the fourth indication information.

Optionally, when the fourth indication information indicates that the status of the second controller is the secondary-controller state or the primary-controller/secondary-controller pending state, the processing module 1130 may be further configured to set the third primary-controller/secondary-controller mode of the first controller to the mode in which the first controller is the primary controller based on the second operating status and the fourth indication information.

Optionally, the first controller and the second controller may be controllers in a steering system.

Optionally, if the first controller is the primary controller, and an operating parameter that is of a steering mechanism in the steering system and that is obtained by the first controller meets a steering function activation condition, the processing module 1130 is further configured to activate a steering function.

Optionally, if the first controller is the secondary controller, an operating status of the first controller is the non-faulty state, and an operating parameter that is of a steering mechanism in the steering system and that is obtained by the first controller meets a steering function activation condition, the processing module 1130 is further configured to control the first controller to be in an on-call state.

Optionally, at least one of the first indication information, the second indication information, the third indication information, the fourth indication information, the fifth indication information, and the sixth indication information may include signals of consecutive frames.

Optionally, if the first controller is the primary controller, the processing module 1130 may be further configured to: calculate a first total control requirement; divide the first total control requirement into a first control requirement allocated to the first controller and a second control requirement allocated to the second controller; and decide to execute the first control requirement.

Optionally, if the first controller is the secondary controller, the receiving module 1120 may be further configured to receive a third control requirement allocated by the second controller to the first controller; and the processing module 1130 may be further configured to decide to execute the third control requirement.

Figure 10:
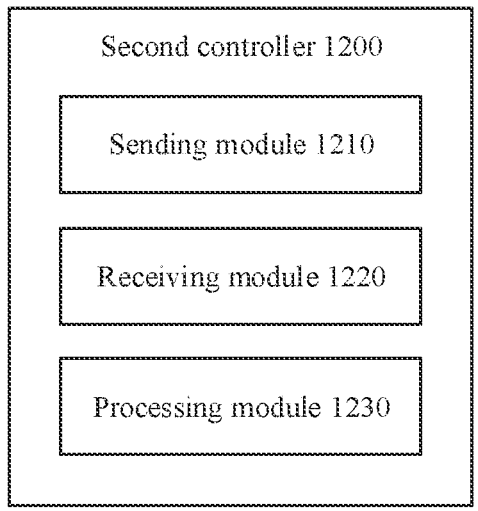
FIG. 10 is a schematic diagram of a second controller according to an embodiment of this application.

FIG. 10 is a schematic diagram of a second controller according to an embodiment of this application. As shown in FIG. 10, the second controller 1200 includes at least a sending module 1210, a receiving module 1220, and a processing module 1230.

The sending module 1210 is configured to send first indication information to a first controller, where the first indication information indicates that a status of the second controller is one of a primary-controller state, a secondary-controller state, or a primary-controller/secondary-controller pending state. The receiving module 1220 is configured to receive second indication information sent by the first controller, where the second indication information indicates a first primary-controller/secondary-controller mode of the first controller. The processing module 1230 is configured to set a first primary-controller/secondary-controller mode of the second controller based on the second indication information, so that the first primary-controller/secondary-controller mode of the second controller does not conflict with the first primary-controller/secondary-controller mode of the first controller, where the first primary-controller/secondary-controller mode of the second controller includes a mode in which the second controller is a primary controller or a mode in which the second controller is a secondary controller.

Optionally, the second controller may further include an obtaining module, configured to obtain an operating status of the second controller.

Optionally, when the sending module 1210 does not send the first indication information to the first controller or the sent first indication information is invalid, the receiving module is further configured to receive third indication information sent by the first controller, where the third indication information indicates a second primary-controller/secondary-controller mode of the first controller; and the processing module 1230 is further configured to set a second primary-controller/secondary-controller mode of the second controller based on the third indication information, so that the second primary-controller/secondary-controller mode of the second controller does not conflict with the second primary-controller/secondary-controller mode of the first controller, where the second primary-controller/secondary-controller mode of the second controller includes the mode in which the second controller is the primary controller or the mode in which the second controller is the secondary controller.

Optionally, when the first controller is the primary controller, the sending module 1210 is further configured to send fourth indication information to the first controller, where the fourth indication information indicates that the status of the second controller is one of the primary-controller state, the secondary-controller state, or the primary-controller/secondary-controller pending state; the receiving module 1220 is further configured to receive fifth indication information sent by the first controller, where the fifth indication information indicates a third primary-controller/secondary-controller mode of the first controller; and the processing module 1230 is further configured to set a third primary-controller/secondary-controller mode of the second controller based on the fifth indication information, so that the third primary-controller/secondary-controller mode of the second controller does not conflict with the third primary-controller/secondary-controller mode of the first controller, where the third primary-controller/secondary-controller mode of the second controller includes the mode in which the second controller is the primary controller or the mode in which the second controller is the secondary controller.

Optionally, when the sending module 1210 does not send the fourth indication information to the first controller or the sent fourth indication information is invalid, the receiving module is further configured to receive sixth indication information sent by the first controller, where the sixth indication information indicates a fourth primary-controller/secondary-controller mode of the first controller; and the processing module 1230 may be further configured to set a fourth primary-controller/secondary-controller mode of the second controller based on the sixth indication information, so that the fourth primary-controller/secondary-controller mode of the second controller does not conflict with the fourth primary-controller/secondary-controller mode of the first controller, where the fourth primary-controller/secondary-controller mode of the second controller includes the mode in which the second controller is the primary controller or the mode in which the second controller is the secondary controller.

Optionally, the first controller and the second controller may be controllers in a steering system.

Optionally, at least one of the first indication information, the second indication information, the third indication information, the fourth indication information, the fifth indication information, and the sixth indication information may include signals of consecutive frames.

Optionally, if the first controller is the secondary controller, the sending module 1210 may be further configured to send a third control requirement of the first controller to the first controller.

Optionally, the processing module 1230 is further configured to, calculate a second total control requirement of a control system; and divide the second total control requirement into a third control requirement allocated to the first controller and a fourth control requirement allocated to the second controller. The receiving module 1220 is further configured to receive the second control requirement allocated by the first controller to the second controller. The processing module 1230 is further configured to execute the second control requirement or the fourth control requirement according to a primary-controller/secondary-controller mode decision of the second controller. Optionally, if the second controller is the primary controller, execution of the fourth control requirement is decided; or if the second controller is the secondary controller, execution of the second control requirement is decided.

It should be understood that the first controller 1100 and the second controller 1200 may be disposed in a same control system. In addition, in this embodiment of this application, the first controller and the second controller may perform the same control method 200 or 300. Therefore, optionally, the first controller 1100 may further include modules having same functions as those included in the second controller 1200, and the second controller 1200 may also include modules having same functions as those included in the first controller 1100. In other words, the first controller and the second controller may have a same structure and function, and can jointly perform the foregoing method 200 or 300. The two controllers operate independently after being powered on, and negotiate with each other to determine respective primary-controller/secondary-controller modes.

Optionally, the first controller is used as an example. The obtaining module 1110, the receiving module 1120, and the sending module 1140 may be an input/output interface 1330, the processing module 1130 may be a processor 1320, and the first controller may further include a memory 1310. Optionally, the second controller is used as an example. The sending module 1210 and the receiving module 1220 in the second controller may be an input/output interface 1330, and the processing module 1230 may be a processor 1320. Optionally, the obtaining module in the second controller may also be an input/output interface 1330, and the second controller may further include a memory 1310. Details are shown in FIG. 11.

Figure 11:
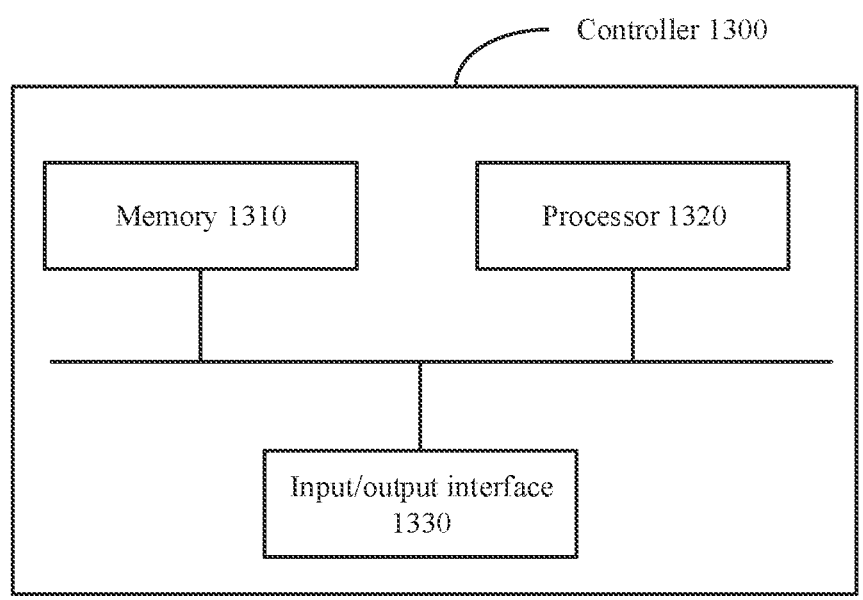
FIG. 11 is a schematic diagram of a controller according to an embodiment of this application.

FIG. 11 is a schematic diagram of a controller according to an embodiment of this application. A controller 1300 shown in FIG. 11 may include a memory 1310, a processor 1320, and an input/output interface 1330. The memory 1310, the processor 1320, and the input/output interface 1330 are connected through an internal connection path. The memory 1310 is configured to store instructions. The processor 1320 is configured to execute the instructions stored in the memory 1320, to control the input/output interface 1330 to obtain indication information sent by another controller in a control system. Optionally, the memory 1310 may be coupled to the processor 1320 through an interface, or may be integrated with the processor 1320.

In an implementation process, the steps in the foregoing methods can be performed by using a hardware integrated logic circuit in the processor 1320, or by using instructions in a form of software. The methods disclosed with reference to embodiments of this application may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1310, and the processor 1320 reads information in the memory 1310 and completes the steps in the foregoing methods in combination with hardware of the processor. To avoid repetition, details are not described herein again.

An embodiment of this application further provides a vehicle, including one or more foregoing first controllers and/or one or more foregoing second controllers. The first controller and the second controller may perform the method 200 or 300. The first controller and the second controller may further perform the foregoing method 700. It should be understood that the vehicle may be an electric vehicle, for example, a battery electric vehicle, a range-extended electric vehicle, a hybrid electric vehicle, a fuel cell vehicle, or a new energy vehicle. This is not specifically limited in this application.

It should be understood that a processor in this embodiment of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that, in this embodiment of this application, a memory may include a read-only memory and a random access memory, and provides an instruction and data to the processor. A part of the processor may further include a non-volatile random access memory. For example, the processor may further store device type information.

It should be understood that the term "and/or" in this application describes only an association relationship between associated objects and represents that three relationships may exist. For example, A and/or B may represent the following three cases: Only A exists, both A and B exist, and only B exists. The character "/" usually indicates an "or" relationship between associated objects.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that the units and algorithm steps described with reference to the examples in embodiments disclosed in this specification may be implemented by electronic hardware or a combination of computer software and electronic hardware. Whether the functions are implemented by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. The parts displayed as units may or may not be physical units, in other words, may be located in one position, or may be distributed on a plurality of network units. Some or all of the units may be selected based on actual requirements to achieve the objectives of the solutions of the embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control method, comprising:
    obtaining, by a first controller, a first operating status of the first controller before at least one of a control function of the first controller or a control function of a second controller is activated, wherein the first operating status comprises a faulty state or a non-faulty state;
    receiving, by the first controller, first indication information sent by the second controller, wherein the first indication information indicates that a status of the second controller is one of a primary-controller state, a secondary-controller state, or a controller pending state;
    setting, by the first controller, a first controller mode of the first controller based on the first operating status and the first indication information, wherein the first controller mode of the first controller comprises a mode in which the first controller is a primary controller or a mode in which the first controller is a secondary controller; and
    sending, by the first controller, second indication information to the second controller, wherein the second indication information indicates the first controller mode of the first controller, wherein a first controller mode of the second controller that is set by the second controller does not conflict with the first controller mode of the first controller, and the first controller mode of the second controller comprises a mode in which the second controller is the primary controller or a mode in which the second controller is the secondary controller.

2. The control method according to claim 1, wherein the control method further comprises:
    when the first controller does not receive the first indication information or the received first indication information is invalid, setting, by the first controller, a second controller mode of the first controller based on the first operating status, wherein:
        when the first operating status is the faulty state, the second controller mode of the first controller is the mode in which the first controller is the secondary controller, or
        when the first operating status is the non-faulty state, the second controller mode of the first controller is the mode in which the first controller is the primary controller; and
    sending, by the first controller, third indication information to the second controller, wherein the third indication information indicates the second controller mode of the first controller, wherein a second controller mode of the second controller that is set by the second controller does not conflict with the second controller mode of the first controller, and the second controller mode of the second controller comprises the mode in which the second controller is the primary controller or the mode in which the second controller is the secondary controller.

3. The control method according to claim 2, wherein when the first controller is the primary controller, the control method further comprises:
    obtaining, by the first controller, a second operating status of the first controller, wherein the second operating status comprises a faulty state or a non-faulty state;
    receiving, by the first controller, fourth indication information sent by the second controller, wherein the fourth indication information indicates that the status of the second controller is one of the primary-controller state, the secondary-controller state, or the controller pending state;

setting, by the first controller, a third controller mode of the first controller based on the second operating status and the fourth indication information, wherein the third controller mode of the first controller comprises the mode in which the first controller is the primary controller or the mode in which the first controller is the secondary controller; and sending, by the first controller, fifth indication information to the second controller, wherein the fifth indication information indicates the third controller mode of the first controller, wherein a third controller mode of the second controller that is set by the second controller does not conflict with the third controller mode of the first controller, and the third controller mode of the second controller comprises the mode in which the second controller is the primary controller or the mode in which the second controller is the secondary controller.

4. The control method according to claim 3, wherein the control method further comprises:

when the first controller does not receive the fourth indication information or the received fourth indication information is invalid, setting, by the first controller, a fourth controller mode of the first controller based on the second operating status, wherein:

when the second operating status is the faulty state, the fourth controller mode of the first controller is the mode in which the first controller is the secondary controller, or when the second operating status is the non-faulty state, the fourth controller mode of the first controller is the mode in which the first controller is the primary controller; and sending, by the first controller, sixth indication information to the second controller, wherein the sixth indication information indicates the fourth controller mode of the first controller, wherein a fourth controller mode of the second controller that is set by the second controller does not conflict with the fourth controller mode of the first controller, and the fourth controller mode of the second controller comprises the mode in which the second controller is the primary controller or the mode in which the second controller is the secondary controller.

5. The control method according to claim 3, wherein:
the second operating status is the faulty state; and
the setting, by the first controller, a third controller mode of the first controller based on the second operating status and the fourth indication information comprises:
setting, by the first controller, the third controller mode of the first controller to the mode in which the first controller is the secondary controller based on the second operating status and the fourth indication information.

6. The control method according to claim 1, wherein:
the first operating status is the faulty state; and
the setting, by the first controller, a first controller mode of the first controller based on the first operating status and the first indication information comprises:
setting, by the first controller, the first controller mode of the first controller to the mode in which the first controller is the secondary controller based on the first operating status and the first indication information.

7. The control method according to claim 1, wherein when the first indication information indicates that the status of the second controller is the primary-controller state, the setting, by the first controller, a first controller mode of the first controller based on the first operating status and the first indication information comprises:
setting, by the first controller, the first controller mode of the first controller to the mode in which the first controller is the secondary controller based on the first operating status and the first indication information.

8. The control method according to claim 1, wherein when the first indication information indicates that the status of the second controller is the secondary-controller state or the controller pending state, and when the first operating status is the non-faulty state, the setting, by the first controller, a first controller mode of the first controller based on the first operating status and the first indication information comprises:
setting, by the first controller, the first controller mode of the first controller to the mode in which the first controller is the primary controller based on the first operating status and the first indication information.

9. A first controller, comprising:
at least one processor; and
one or more memories coupled to the at least one processor and storing programming instructions for execution by the at least one processor to perform operations comprising:
before at least one of a control function of the first controller or a control function of a second controller is activated, obtaining a first operating status of the first controller, wherein the first operating status comprises a faulty state or a non-faulty state;
receiving first indication information sent by the second controller, wherein the first indication information indicates that a status of the second controller is one of a primary-controller state, a secondary-controller state, or a controller pending state;
setting a first controller mode of the first controller based on the first operating status and the first indication information, wherein the first controller mode of the first controller comprises a mode in which the first controller is a primary controller or a mode in which the first controller is a secondary controller; and
sending second indication information to the second controller, wherein the second indication information indicates the first controller mode of the first controller, wherein a first controller mode of the second controller that is set by the second controller does not conflict with the first controller mode of the first controller, and the first controller mode of the second controller comprises a mode in which the second controller is the primary controller or a mode in which the second controller is the secondary controller.

10. The first controller according to claim 9, wherein the operations comprise:
when the first indication information is not received or the received first indication information is invalid, setting a second controller mode of the first controller based on the first operating status, wherein:
when the first operating status is the faulty state, the second controller mode of the first controller is the mode in which the first controller is the secondary controller, or when the first operating status is the non-faulty state, the second controller mode of the first controller is the mode in which the first controller is the primary controller; and sending third indication information to the second controller, wherein the third indication information indicates the second controller mode of the first controller, wherein a second controller mode of the second controller that is set by the second controller does not conflict with the second controller mode of the first controller, and the second controller mode of the second controller comprises the mode in which the second controller is the primary controller or the mode in which the second controller is the secondary controller.

11. The first controller according to claim 10, wherein when the first controller is the primary controller, the operations further comprise:

obtaining a second operating status of the first controller, wherein the second operating status comprises a faulty state or a non-faulty state;

receiving fourth indication information sent by the second controller, wherein the fourth indication information indicates that the status of the second controller is one of the primary-controller state, the secondary-controller state, or the controller pending state;

setting a third controller mode of the first controller based on the second operating status and the fourth indication information, wherein the third controller mode of the first controller comprises the mode in which the first controller is the primary controller or the mode in which the first controller is the secondary controller; and sending fifth indication information to the second controller, wherein the fifth indication information indicates the third controller mode of the first controller, wherein a third controller mode of the second controller that is set by the second controller does not conflict with the third controller mode of the first controller, and the third controller mode of the second controller comprises the mode in which the second controller is the primary controller or the mode in which the second controller is the secondary controller.

12. The first controller according to claim 9, wherein: the first operating status is the faulty state; and the operations comprise:

setting the first controller mode of the first controller to the mode in which the first controller is the secondary controller based on the first operating status and the first indication information.

13. The first controller according to claim 9, wherein the operations comprise:

when the first indication information indicates that the status of the second controller is the primary-controller state, setting the first controller mode of the first controller to the mode in which the first controller is the secondary controller based on the first operating status and the first indication information.

14. The first controller according to claim 9, wherein the operations comprise:

when the first indication information indicates that the status of the second controller is the secondary-controller state or the controller pending state, and when the first operating status is the non-faulty state, setting the first controller mode of the first controller to the mode in which the first controller is the primary controller based on the first operating status and the first indication information.

15. A second controller, comprising:
at least one processor; and
one or more memories coupled to the at least one processor and storing programming instructions for execution by the at least one processor to perform operations comprising:

before at least one of a control function of a first controller or a control function of the second controller is activated, sending first indication information to the first controller, wherein the first indication information indicates that a status of the second controller is one of a primary-controller state, a secondary-controller state, or a controller pending state;

receiving second indication information sent by the first controller, wherein the second indication information indicates a first controller mode of the first controller, wherein the first controller mode of the first controller is determined based on a first operating status of the first controller and the first indication information; and setting a first controller mode of the second controller based on the second indication information, wherein the first controller mode of the second controller does not conflict with the first controller mode of the first controller, and wherein the first controller mode of the second controller comprises a mode in which the second controller is a primary controller or a mode in which the second controller is a secondary controller.

16. The second controller according to claim 15, wherein the operations comprise:

when the first indication information is not sent to the first controller or the sent first indication information is invalid, receiving third indication information sent by the first controller, wherein the third indication information indicates a second controller mode of the first controller; and setting a second controller mode of the second controller based on the third indication information, wherein the second controller mode of the second controller does not conflict with the second controller mode of the first controller, and wherein the second controller mode of the second controller comprises the mode in which the second controller is the primary controller or the mode in which the second controller is the secondary controller.

17. The second controller according to claim 16, wherein when the first controller is the primary controller, the operations further comprise:

sending fourth indication information to the first controller, wherein the fourth indication information indicates that the status of the second controller is one of the primary-controller state, the secondary-controller state, or the controller pending state;

receiving fifth indication information sent by the first controller, wherein the fifth indication information indicates a third controller mode of the first controller; and setting a third controller mode of the second controller based on the fifth indication information, wherein the third controller mode of the second controller does not conflict with the third controller mode of the first controller, and wherein the third controller mode of the second controller comprises the mode in which the second controller is the primary controller or the mode in which the second controller is the secondary controller.

18. The second controller according to claim 17, wherein when the fourth indication information is not sent to the first controller or the sent fourth indication information is invalid, the operations further comprise:

receiving sixth indication information sent by the first controller, wherein the sixth indication information indicates a fourth controller mode of the first controller; and setting a fourth controller mode of the second controller based on the sixth indication information, wherein the fourth controller mode of the second controller does not conflict with the fourth controller mode of the first controller, and wherein the fourth controller mode of the second controller comprises the mode in which the second controller is the primary controller or the mode in which the second controller is the secondary controller.

19. The second controller according to claim 18, wherein at least one of the first indication information, the second indication information, the third indication information, the fourth indication information, the fifth indication information, or the sixth indication information includes signals of consecutive frames.

20. The second controller according to claim 15, wherein the first controller and the second controller are controllers in a steering system.

\* \* \* \* \*